(12) United States Patent
Lim et al.

(10) Patent No.: US 11,729,411 B2
(45) Date of Patent: *Aug. 15, 2023

(54) INTER PREDICTION MODE-BASED IMAGE PROCESSING METHOD AND APPARATUS THEREFOR

(71) Applicant: LG ELECTRONICS INC., Seoul (KR)

(72) Inventors: Jaehyun Lim, Seoul (KR); Naeri Park, Seoul (KR); Jungdong Seo, Seoul (KR); Junghak Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/831,288

(22) Filed: Jun. 2, 2022

(65) Prior Publication Data

US 2022/0337862 A1    Oct. 20, 2022

Related U.S. Application Data

(63) Continuation of application No. 17/010,474, filed on Sep. 2, 2020, now Pat. No. 11,368,707, which is a
(Continued)

(51) Int. Cl.
*H04N 19/51* (2014.01)
*H04N 19/53* (2014.01)
(Continued)

(52) U.S. Cl.
CPC .......... *H04N 19/51* (2014.11); *H04N 19/176* (2014.11); *H04N 19/513* (2014.11);
(Continued)

(58) Field of Classification Search
CPC ..... H04N 19/513; H04N 19/52; H04N 19/523
See application file for complete search history.

(56) References Cited

U.S. PATENT DOCUMENTS

| 9,930,341 B2 | 3/2018 | Rapaka | ................. H04N 19/52 |
| 10,587,891 B2 * | 3/2020 | Zhou | ..................... H04N 19/52 |

(Continued)

FOREIGN PATENT DOCUMENTS

| CN | 103931194 A | 7/2014 | |
| CN | 105900425 A * | 8/2016 | .............. G06T 7/00 |

(Continued)

OTHER PUBLICATIONS

"Test Model under Consideration," Joint Collaborative Team on Video Coding (JCT-VC) of ITU-T SG16, WP3 and ISO/IEC JTC1 /SC29 /WG11/ 2nd Meeting, Jul. 21-28, 2010, (JCTVC-B205)(Version 1—date Mar. 19, 2012 15:37:06)) Geneva Meeting, T. Wiegand, (7 Pages).

(Continued)

*Primary Examiner* — Rowina J Cattungal
(74) *Attorney, Agent, or Firm* — Bryan Cave Leighton Paisner LLP

(57) ABSTRACT

Disclosed are an inter prediction mode-based image processing method and an apparatus therefor. Particularly, a method for processing an image on the basis of inter prediction may comprise the steps of: determining whether a motion vector scale adaptation is applied to a block; up-scaling a down-scaled MVD (Motion Vector Difference) when the motion vector scale adaptation is applied to the block; deriving a MV (Motion Vector) for the block, using the up-scaled MVD and a MVP (Motion Vector Predictor); and generating a predictive block of the block, using the derived MV.

13 Claims, 18 Drawing Sheets

Related U.S. Application Data continuation of application No. 15/754,720, filed as application No. PCT/KR2016/002037 on Feb. 29, 2016, now Pat. No. 10,798,400.

(60) Provisional application No. 62/213,627, filed on Sep. 3, 2015, provisional application No. 62/208,830, filed on Aug. 24, 2015.

(51) Int. Cl.
  *H04N 19/70* (2014.01)
  *H04N 19/513* (2014.01)
  *H04N 19/523* (2014.01)
  *H04N 19/176* (2014.01)

(52) U.S. Cl.
  CPC ........... *H04N 19/523* (2014.11); *H04N 19/53* (2014.11); *H04N 19/70* (2014.11)

(56) References Cited

U.S. PATENT DOCUMENTS

| | | | |
|---|---|---|---|
| 10,924,746 B2* | 2/2021 | Chuang | H04N 19/159 |
| 2010/0246681 A1 | 9/2010 | Wang | H04N 19/16 375/240.16 |
| 2012/0207220 A1 | 8/2012 | Kim et al. | |
| 2013/0170553 A1 | 7/2013 | Chen | H04N 19/50 375/240.16 |
| 2013/0177084 A1 | 7/2013 | Wang et al. | |
| 2014/0023144 A1 | 1/2014 | Park | H04N 19/107 375/240.16 |
| 2014/0177707 A1 | 6/2014 | George et al. | |
| 2014/0185686 A1 | 7/2014 | Wu | H04N 19/573 375/240.16 |
| 2014/0286427 A1 | 9/2014 | Fukushima | H04N 19/105 375/240.16 |
| 2015/0071356 A1 | 3/2015 | Kim et al. | |
| 2015/0098504 A1 | 4/2015 | Pang | H04N 19/176 375/240.12 |
| 2015/0264386 A1 | 9/2015 | Pang | H04N 19/52 375/240.16 |
| 2015/0373334 A1 | 12/2015 | Rapaka | H04N 19/13 375/240.02 |
| 2015/0382010 A1 | 12/2015 | Rapaka | H04N 19/139 375/240.16 |
| 2016/0337662 A1 | 11/2016 | Pang | H04N 19/176 |
| 2017/0339426 A1 | 11/2017 | Lee | H04N 19/51 |

FOREIGN PATENT DOCUMENTS

| | | |
|---|---|---|
| KR | 20140057220 A | 5/2014 |
| KR | 20140075661 A | 6/2014 |
| KR | 20150083826 A | 7/2015 |

OTHER PUBLICATIONS

International Telecommunication Union, ITU-T Telecommunication Standardization Sector of ITU, "Series H: Audiovisual and Multimedia Systems Infrastructure of audiovisual services—Coding of moving video, High efficiency video coding", Recommendation ITU-T H.265, Mar. 1, 2013, XP055206562.

XP030007704, Anonymous: "Test Model under Consideration", XP 030007704, Jul. 28, 2010, Geneva; JCT-VC; Joint Collaboration Team on Video Coding (JCT-VC) of ITU-T SG.16; WP3 and ISO/IEC JTC1/SC29/WG11 2nd meeting: pp. 1-152.

XP 030117473, JCT-VC;-U0054-v3; Gisquet C et al: "Non-CE2: On interpretation of the IBC vectors", Canon CRF; Warsaw, Poland, 21st Meeting; Jun. 19, 2015, pp. 1-8.

Flynn et al."High Efficiency Video Coding (HEVC) Range Extensions text specification: Draft 6," Document: JCTVC-P1005_v1, JCT-VC of ITU-T SG 16 WP 3 and ISO/IEC JTC 1/SC 29/WG 11, 16.sup.th Meeting: San Jose, US Jan. 9-17, 2014 (Year: 2014).

* cited by examiner

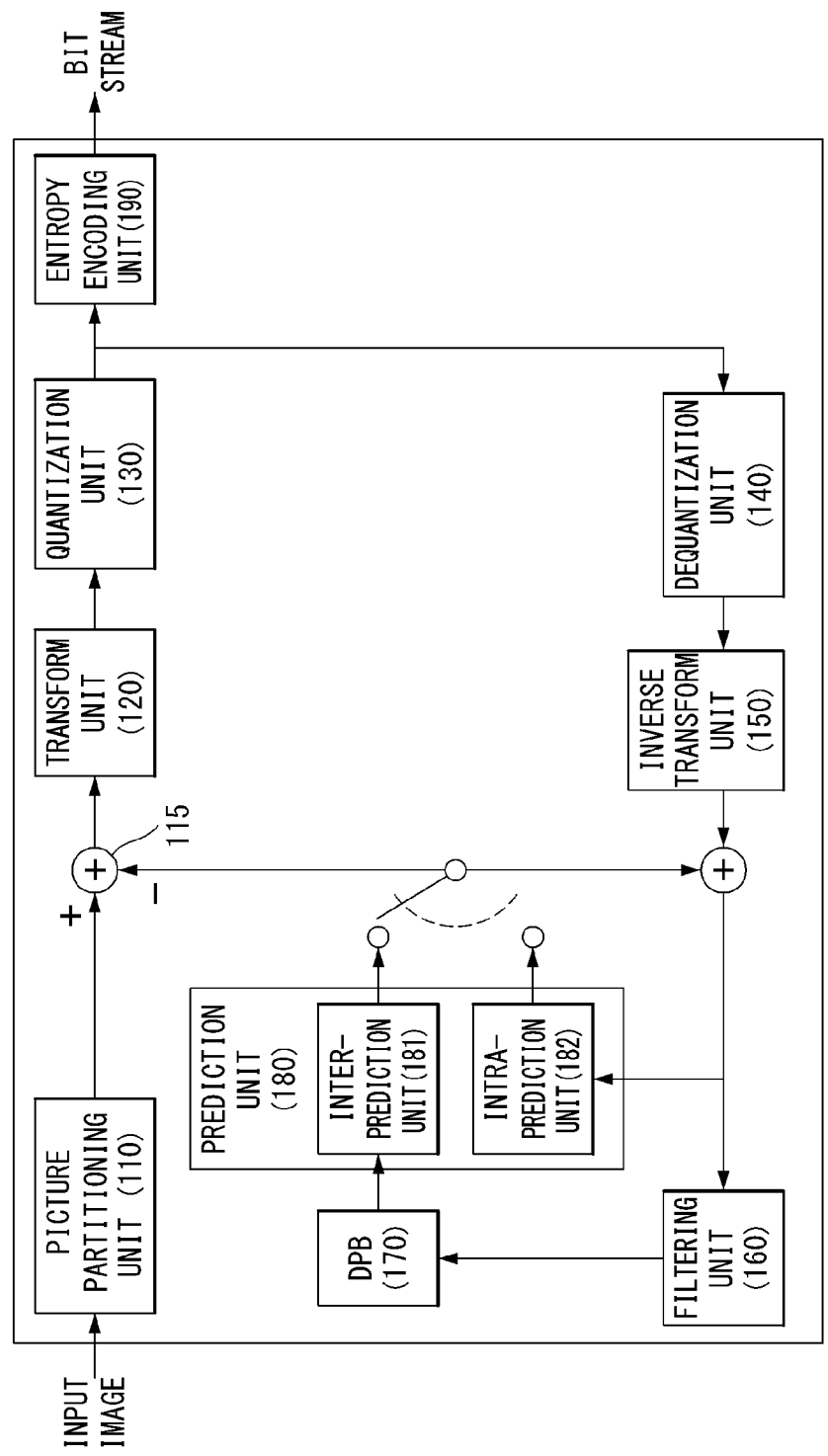
[Fig. 1]

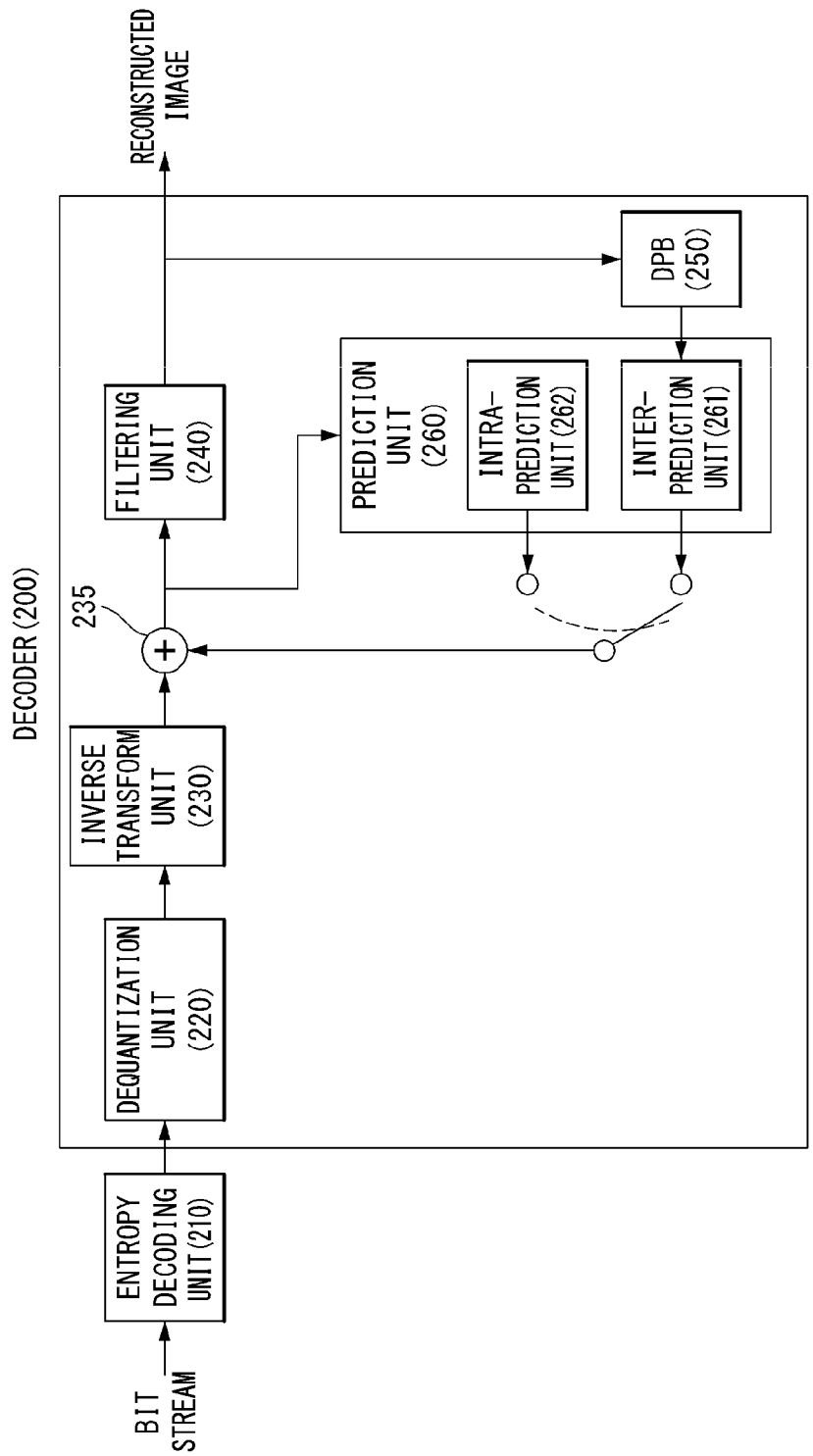
[Fig. 2]

[Fig. 3]
Depth = 0
Depth = 1
Depth = 2
Depth = 3
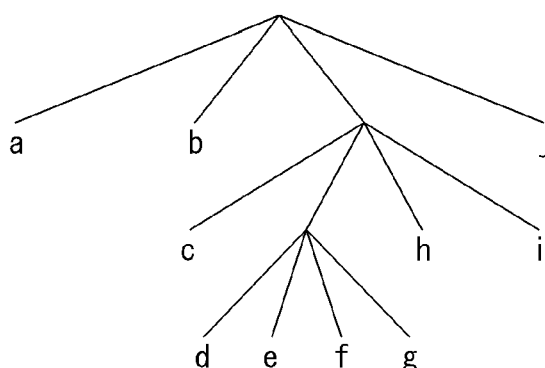
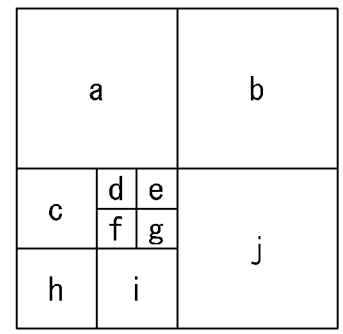
(A)　　　　　　　　　(B)

[Fig. 4]
Intra:
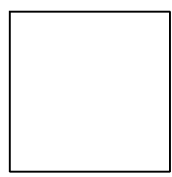 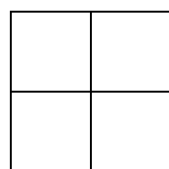
2Nx2N  NxN
Inter:
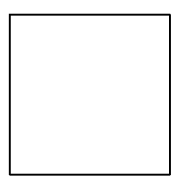 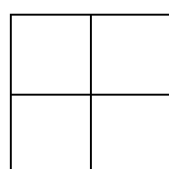 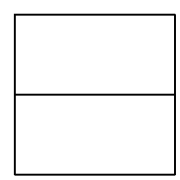 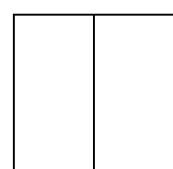
2Nx2N  NxN  2NxN  Nx2N
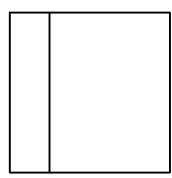 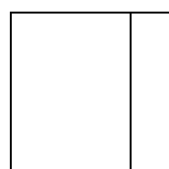 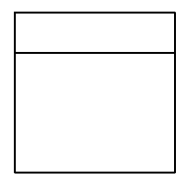 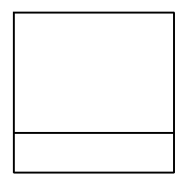
nLx2N  nRx2N  2NxnU  2NxnD

[Fig. 5]
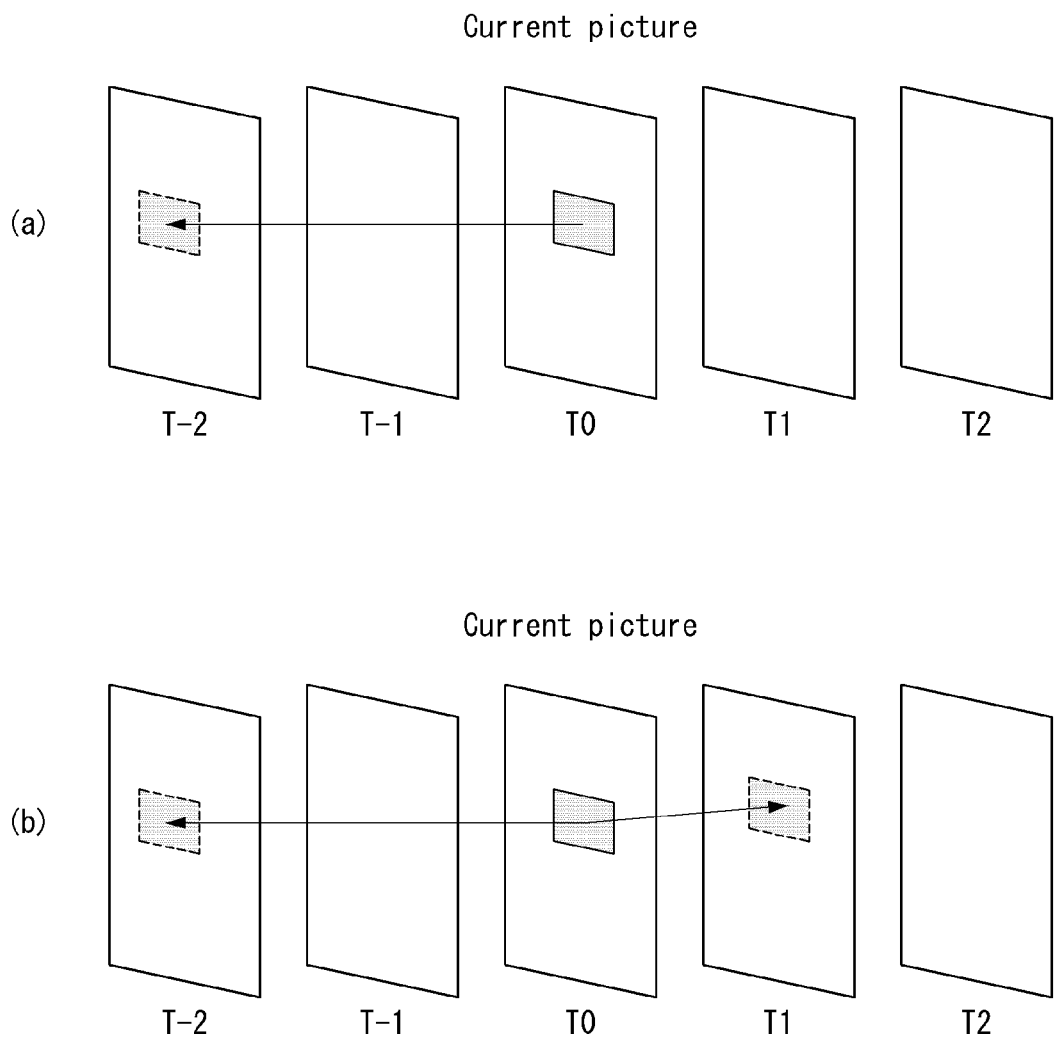

[Fig. 6]

| A -1,-1 | | | | A 0,-1 | a 0,-1 | b 0,-1 | c 0,-1 | A 1,-1 | | | | A 2,-1 |
|---|---|---|---|---|---|---|---|---|---|---|---|---|
| | | | | | | | | | | | | |
| | | | | | | | | | | | | |
| | | | | | | | | | | | | |
| A -1,0 | | | | A 0,0 | a 0,0 | b 0,0 | c 0,0 | A 1,0 | | | | A 2,0 |
| d -1,0 | | | | d 0,0 | e 0,0 | f 0,0 | g 0,0 | d 1,0 | | | | d 2,0 |
| h -1,0 | | | | h 0,0 | i 0,0 | j 0,0 | k 0,0 | h 1,0 | | | | h 2,0 |
| n -1,0 | | | | n 0,0 | p 0,0 | q 0,0 | r 0,0 | n 1,0 | | | | n 2,0 |
| A -1,1 | | | | A 0,1 | a 0,1 | b 0,1 | c 0,1 | A 1,1 | | | | A 2,1 |
| | | | | | | | | | | | | |
| | | | | | | | | | | | | |
| | | | | | | | | | | | | |
| A -1,2 | | | | A 0,2 | a 0,2 | b 0,2 | c 0,2 | A 1,2 | | | | A 2,2 |

[Fig. 7]
(a)
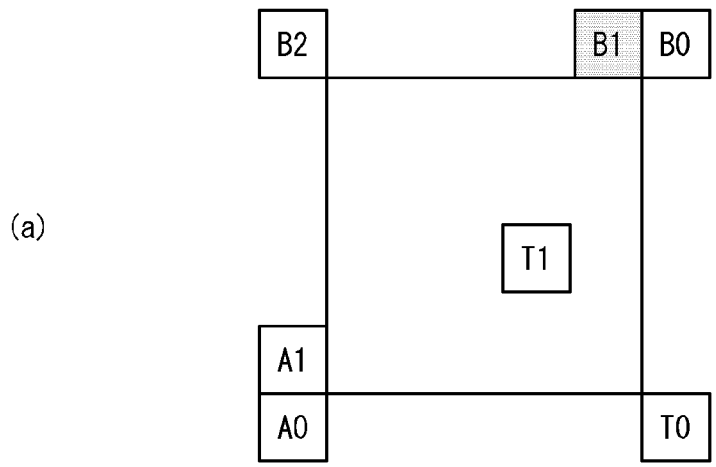
(b)
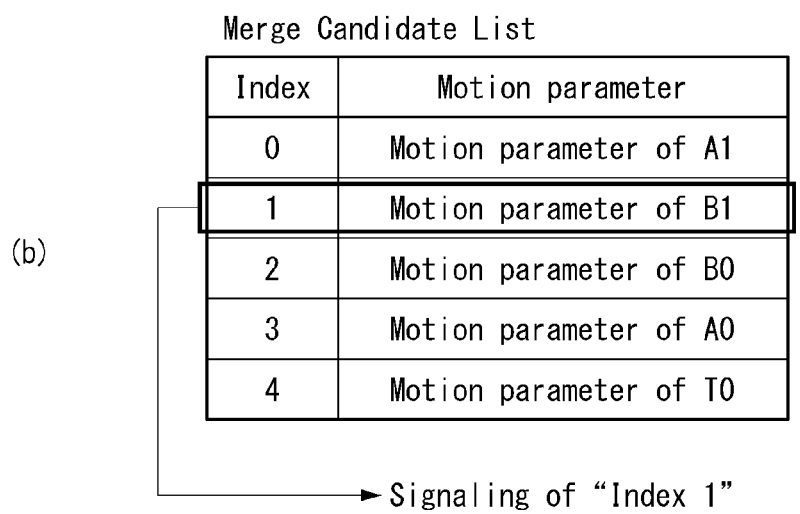

[Fig. 8]
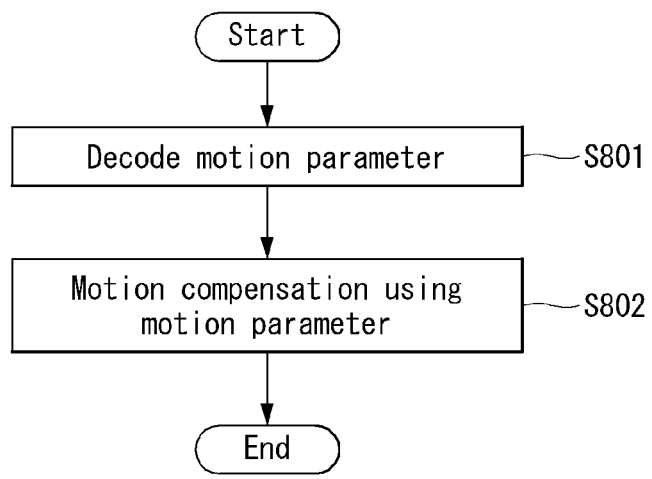

[Fig. 9]
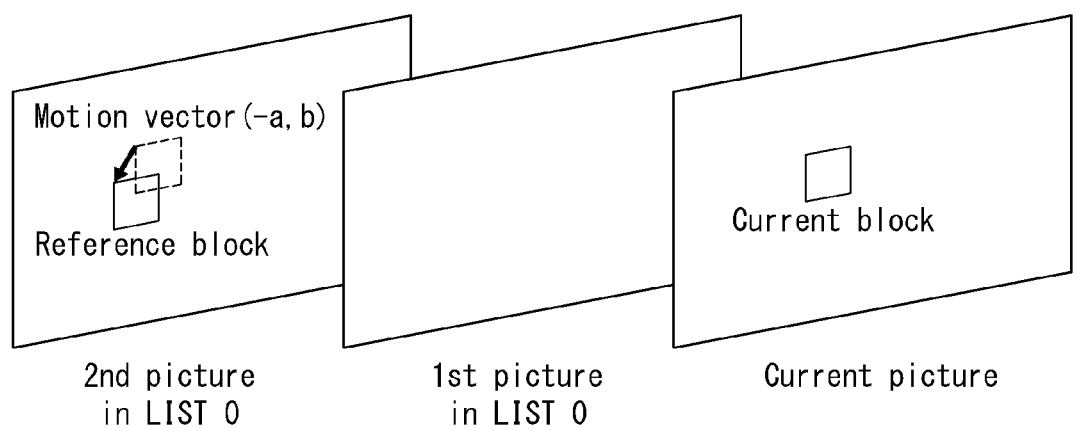

[Fig. 10]
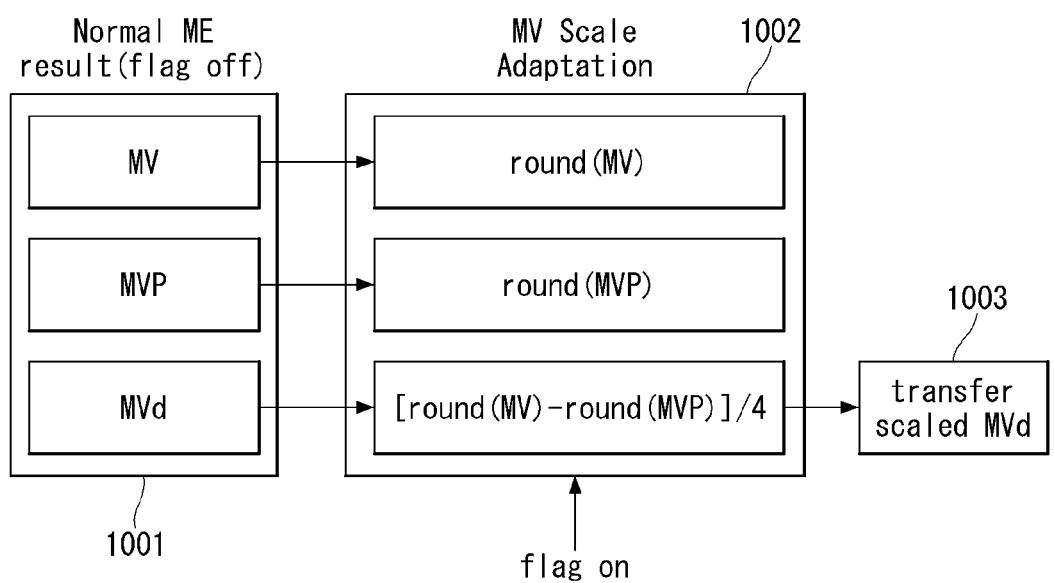

[Fig. 11]
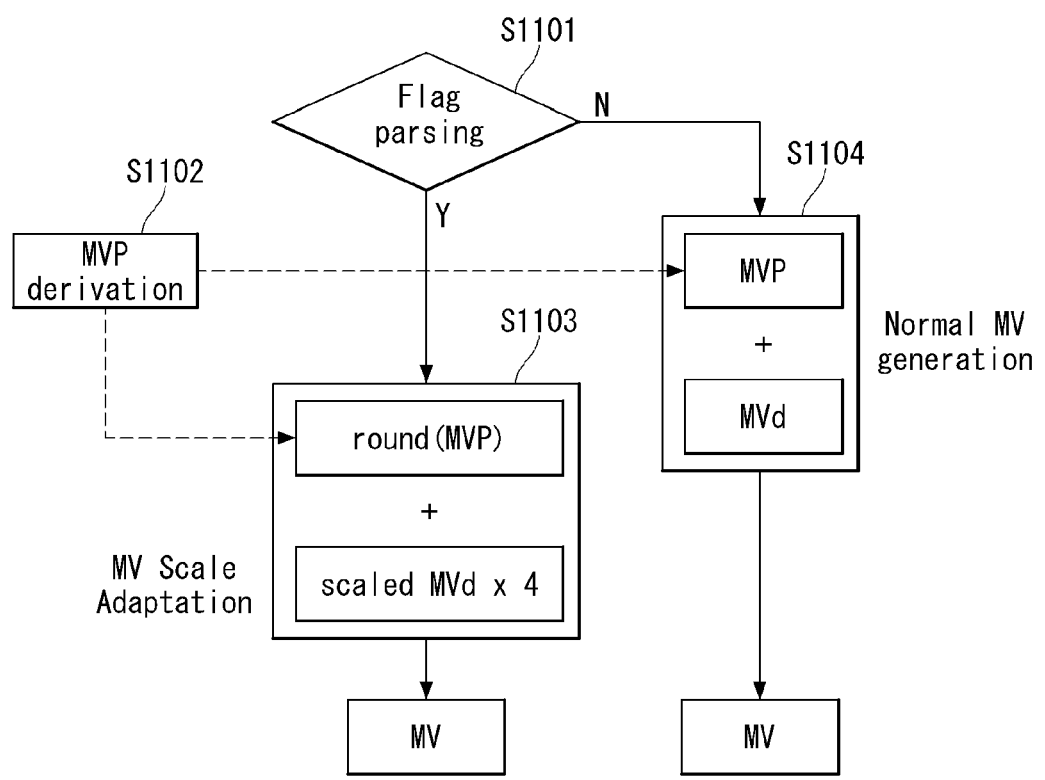

[Fig. 12]
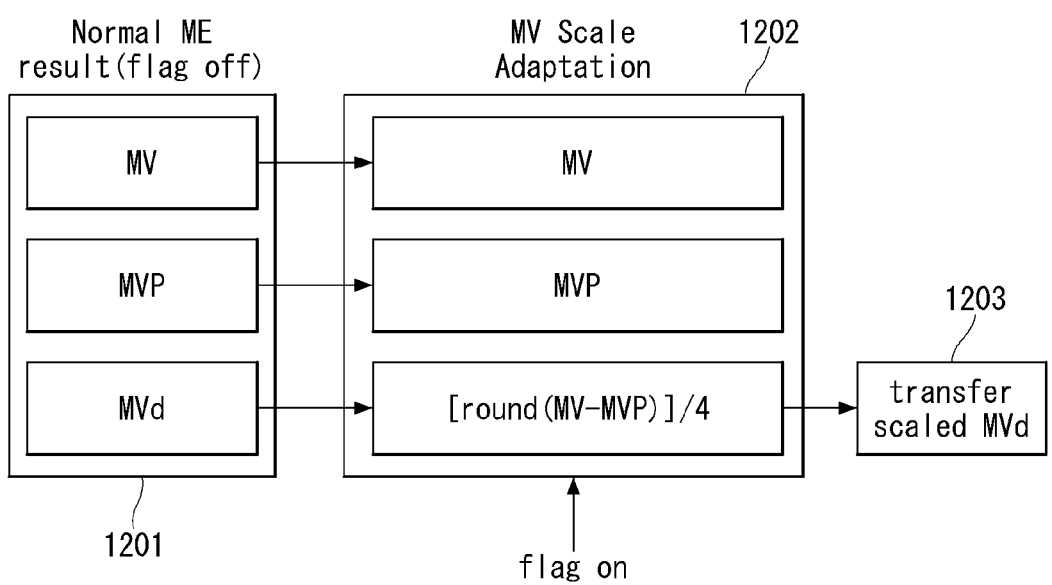

[Fig. 13]
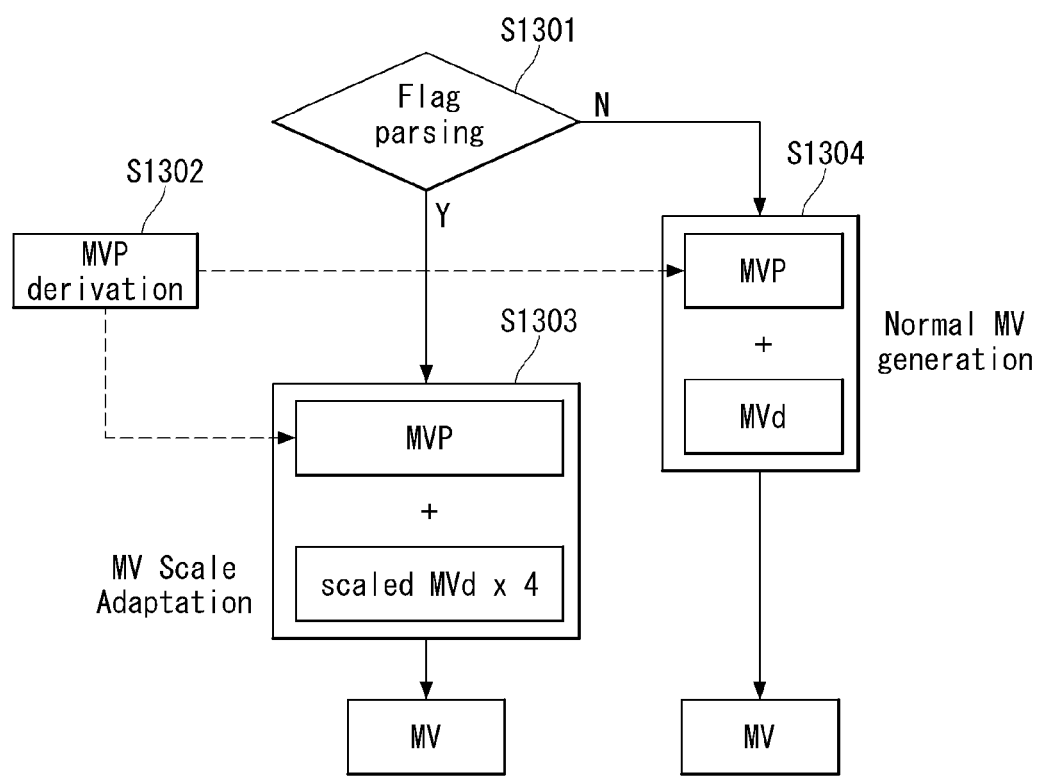

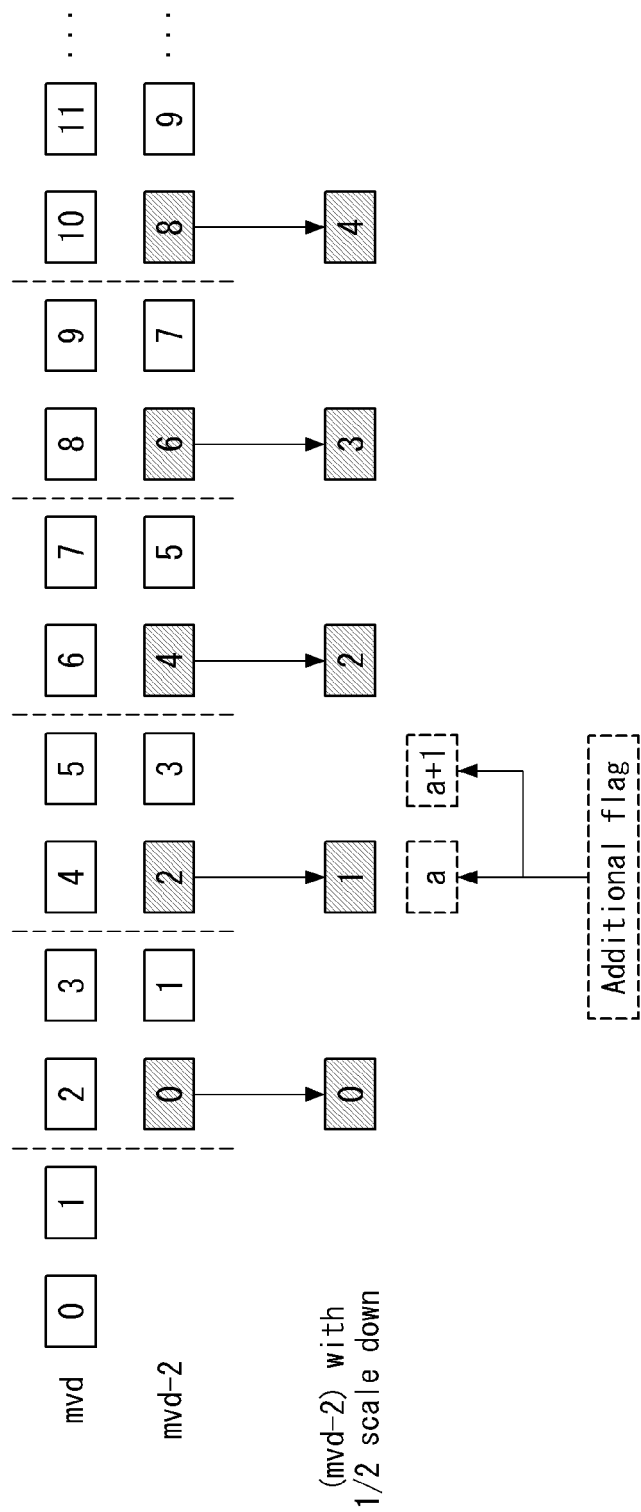
[Fig. 14]

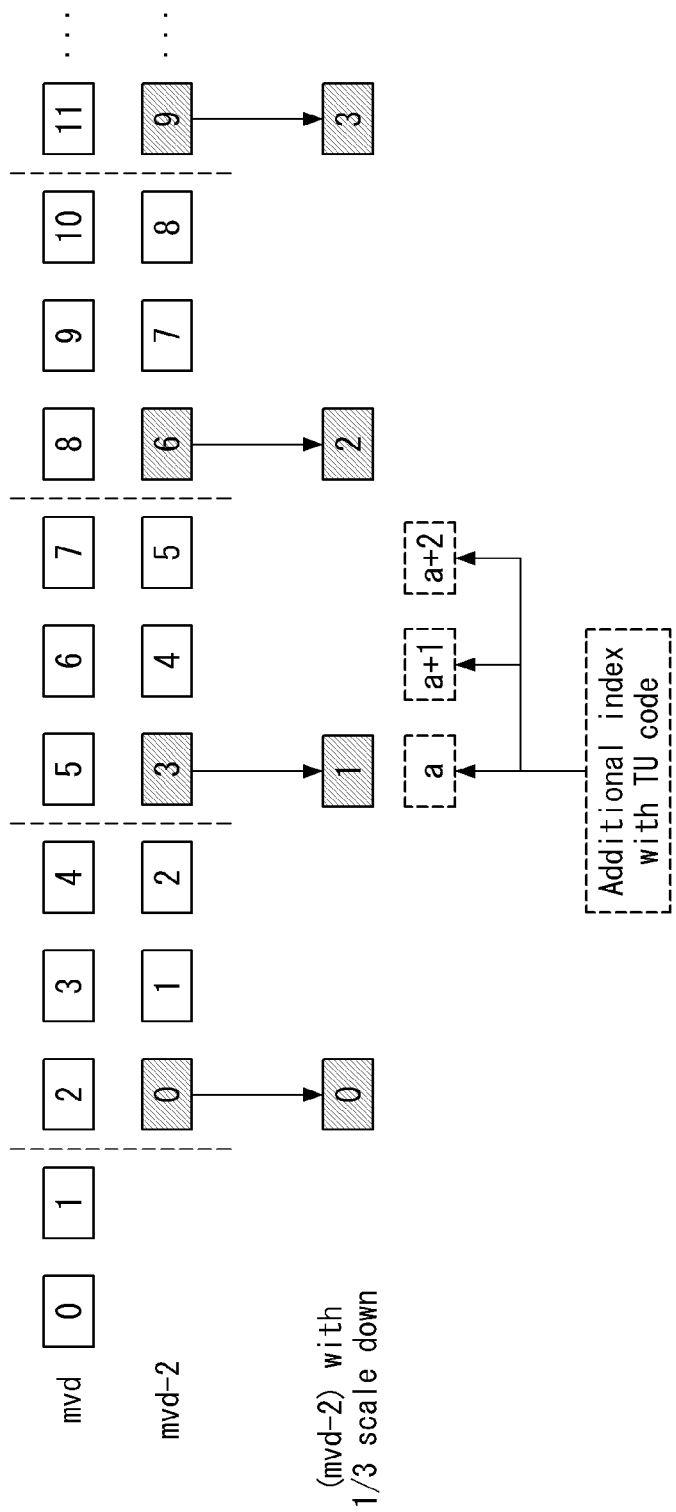

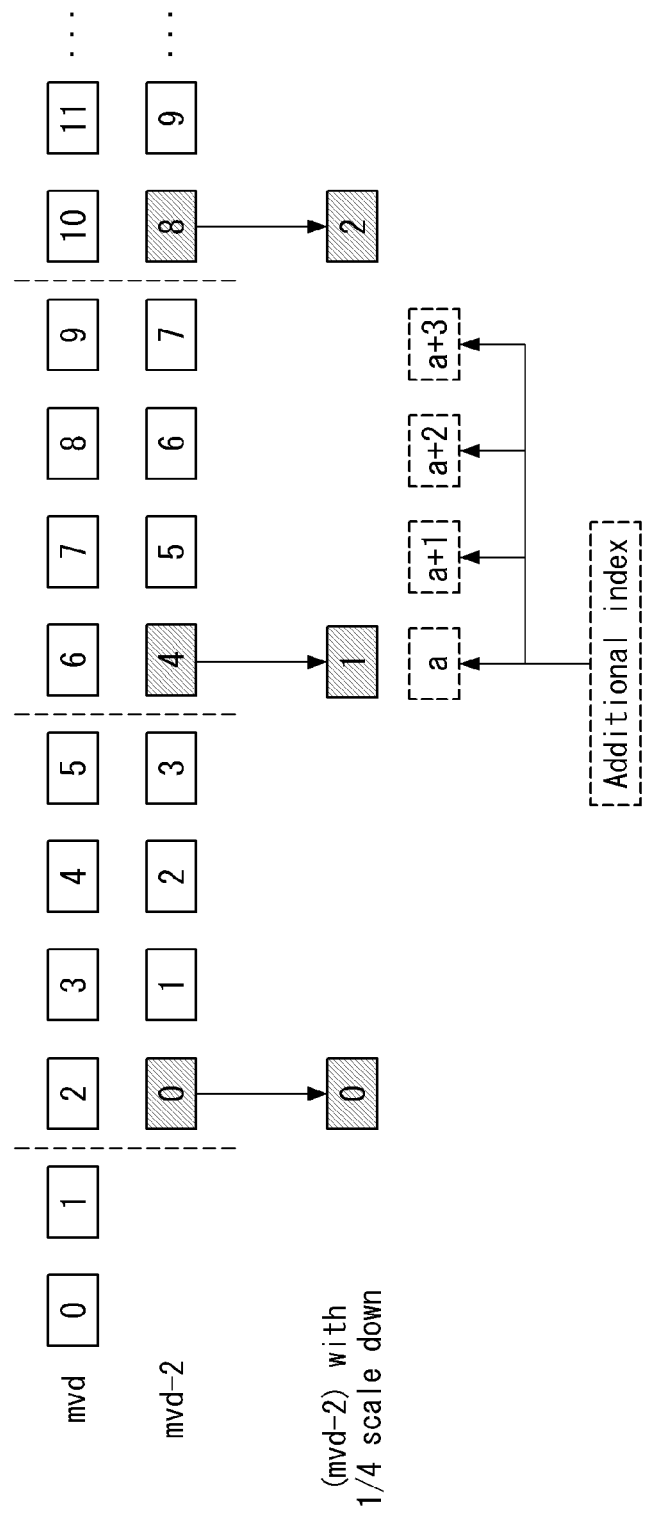

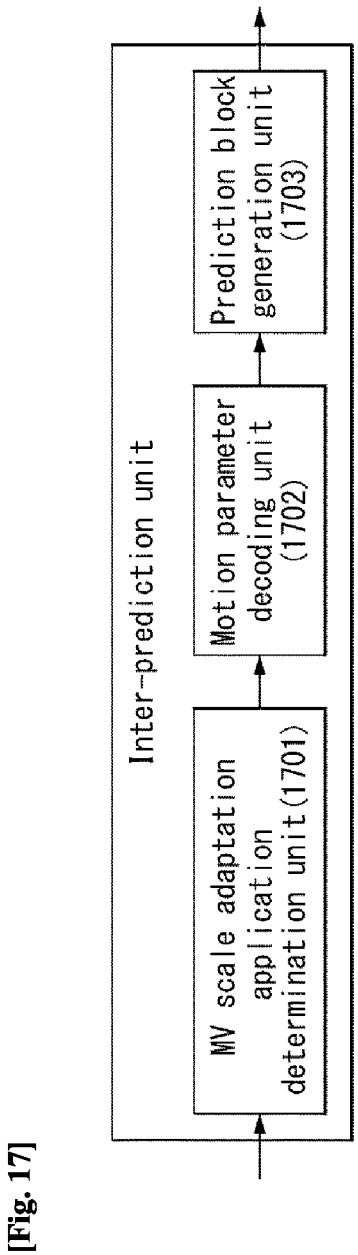
[Fig. 17]

[Fig. 18]
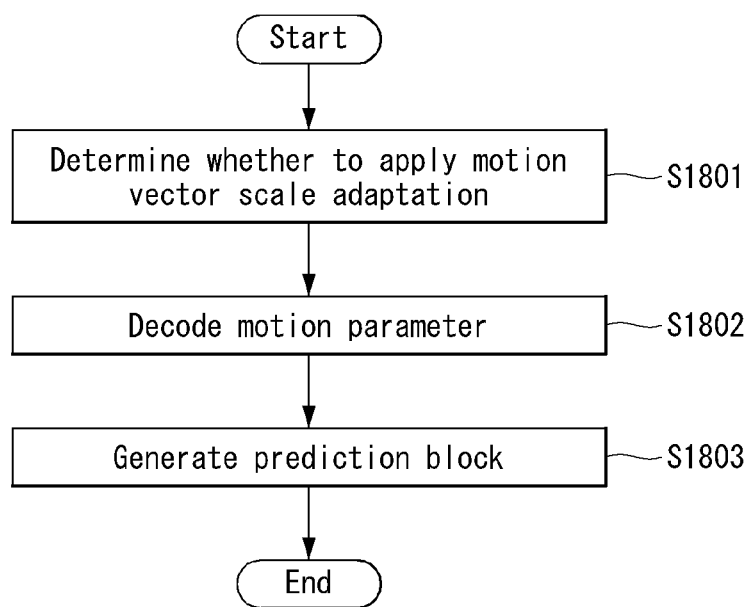

INTER PREDICTION MODE-BASED IMAGE PROCESSING METHOD AND APPARATUS THEREFOR

CROSS-REFERENCE TO RELATED APPLICATIONS

This application is a continuation application of U.S. patent application Ser. No. 17/010,474, filed Sep. 2, 2020, which is a continuation application of U.S. patent application Ser. No. 15/754,720, filed Feb. 23, 2018, now U.S. Pat. No. 10,798,400, which is the National Stage filing under 35 U.S.C. 371 of International Application No. PCT/KR2016/002037, filed Feb. 29, 2016, which claims the benefit of U.S. Provisional Application No. 62/208,830, filed Aug. 24, 2015 and U.S. Provisional Application No. 62/213,627, filed Sep. 3, 2015, which are hereby incorporated by reference as fully set forth herein.

TECHNICAL FIELD

The present invention relates to a method of processing a still image or a moving image and, more particularly, to a method of encoding/decoding a still image or a moving image based on an inter-prediction mode and an apparatus supporting the same.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

DISCLOSURE

Technical Problem

The present invention proposes a method of adaptively changing the scale of motion vector-related information in an inter-prediction (or inter-picture prediction) process.

Furthermore, the present invention proposes a method of grouping motion vector differences into sections and binary-encoding the motion vector differences.

Technical objects to be achieved by the present invention are not limited to the aforementioned technical objects, and other technical objects not described above may be evidently understood by a person having ordinary skill in the art to which the present invention pertains from the following description.

Technical Solution

In an aspect of the present invention, a method of processing an image based on inter-prediction may include the steps of determining whether motion vector scale adaptation for a block is applied, up-scaling a down-scaled MVD (Motion Vector Difference) if the motion vector scale adaptation for the block is applied, deriving a MV (Motion Vector) for the block using the up-scaled MVD and a MVP (Motion Vector Predictor), and generating a prediction block of the block using the derived MV.

In an aspect of the present invention, an apparatus for processing an image based on inter-prediction may include a motion vector scale adaptation application determination unit determining whether motion vector scale adaptation for a block is applied, a motion parameter decoding unit up-scaling a down-scaled MVD (Motion Vector Difference) if the motion vector scale adaptation for the block is applied and deriving a MV (Motion Vector) for the block using the up-scaled MVD and a MVP (Motion Vector Predictor), and a prediction block generation unit generating a prediction block of the block using the derived MV.

Preferably, the down-scaled MVD may be generated by applying at least any one of round, floor, and ceiling operations to a value obtained by subtracting the MVP from the MV.

Preferably, if a flag value indicating whether motion vector scale adaptation is applied is 1, the motion vector scale adaptation for the block may be determined to be applied.

Preferably, a flag indicating whether the motion vector scale adaptation is applied may be parsed only when the down-scaled MVD is not 0.

Preferably, the down-scaled MVD value may be grouped in units of intervals and binary-encoded.

Preferably, the down-scaled MVD value may be encoded as a start value of a interval to which the down-scaled MVD value belongs and indication information for indicating the down-scaled MVD value within the interval.

Preferably, the start value may be down-scaled at a ratio of the size of the interval and transmitted.

Preferably, the size of the interval may be previously determined or transmitted by an encoder.

Preferably, the down-scaled MVD value may be grouped in units of intervals and encoded only when the down-scaled MVD value is 2 or more.

Preferably, the size of the interval may be set to a square number of 2.

Advantageous Effects

In accordance with an embodiment of the present invention, the absolute value of motion vector-related information can be reduced by adaptively changing the scale of motion vector-related information. As a result, the amount of additional information to be transmitted can be reduced.

Furthermore, in accordance with an embodiment of the present invention, the amount of information used to encode a motion vector difference can be reduced by grouping motion vector differences into specific intervals and binary-encoding them. As a result, the amount of additional information can be reduced.

Technical effects which may be obtained in the present invention are not limited to the technical effects described above, and other technical effects not mentioned herein may be understood to those skilled in the art from the description below.

DESCRIPTION OF DRAWINGS

The accompanying drawings, which are included herein as a part of the description for help understanding the present invention, provide embodiments of the present invention, and describe the technical features of the present invention with the description below.

FIG. 1 is illustrates a schematic block diagram of an encoder in which the encoding of a still image or video signal is performed, as an embodiment to which the present invention is applied.

FIG. 2 illustrates a schematic block diagram of a decoder in which decoding of a still image or video signal is performed, as an embodiment to which the present invention is applied.

FIG. 3 is a diagram for describing a split structure of a coding unit that may be applied to the present invention.

FIG. 4 is a diagram for describing a prediction unit that may be applied to the present invention.

FIG. 5 is an embodiment to which the present invention may be applied and is a diagram illustrating the direction of inter-prediction.

FIG. 6 is an embodiment to which the present invention may be applied and illustrates integers for ¼ sample interpolation and a fraction sample locations.

FIG. 7 is an embodiment to which the present invention may be applied and illustrates the location of a spatial candidate.

FIG. 8 is an embodiment to which the present invention is applied and is a diagram illustrating an inter-prediction method.

FIG. 9 is an embodiment to which the present invention may be applied and is a diagram illustrating a motion compensation process.

FIG. 10 illustrates a method of performing inter-prediction by applying motion vector scale adaptation according to an embodiment of the present invention.

FIG. 11 illustrates a method of performing inter-prediction using motion vector scale adaptation according to an embodiment of the present invention.

FIG. 12 illustrates a method of performing inter-prediction using motion vector scale adaptation according to an embodiment of the present invention.

FIG. 13 illustrates a method of performing inter-prediction using motion vector scale adaptation according to an embodiment of the present invention.

FIG. 14 illustrates a method of encoding/decoding a motion vector difference according to an embodiment of the present invention.

FIG. 15 illustrates a method of encoding a motion vector difference according to an embodiment of the present invention.

FIG. 16 illustrates a method of encoding a motion vector difference according to an embodiment of the present invention.

FIG. 17 is a diagram illustrating an intra-prediction unit according to an embodiment of the present invention.

FIG. 18 is a diagram illustrating an inter-prediction-based image processing method according to an embodiment of the present invention.

MODE FOR INVENTION

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. Furthermore, the specific terminology may be modified into other forms within the scope of the technical concept of the present invention. For example, a signal, data, a sample, a picture, a frame, a block, etc may be properly replaced and interpreted in each coding process.

Hereinafter, in this specification, a "processing unit" means a unit in which an encoding/decoding processing process, such as prediction, transform and/or quantization, is performed. Hereinafter, for convenience of description, a processing unit may also be called a "unit", "processing block" or "block."

A processing unit may be construed as having a meaning including a unit for a luma component and a unit for a chroma component. For example, a processing unit may correspond to a coding tree unit (CTU), a coding unit (CU), a prediction unit (PU) or a transform unit (TU).

Furthermore, a processing unit may be construed as being a unit for a luma component or a unit for a chroma component. For example, the processing unit may correspond to a coding tree block (CTB), coding block (CB), prediction block (PB) or transform block (TB) for a luma component. Alternatively, a processing unit may correspond to a coding tree block (CTB), coding block (CB), prediction block (PB) or transform block (TB) for a chroma component.

Furthermore, a processing unit is not essentially limited to a square block and may be constructed in a polygon form having three or more vertices.

Furthermore, in this specification, the transmission or reception of specific data or information may be construed as including the corresponding data or information within a bit stream including an encoded image and data related to encoding.

General Apparatus to which the Present Invention May be Applied

FIG. 1 is illustrates a schematic block diagram of an encoder in which the encoding of a still image or video signal is performed, as an embodiment to which the present invention is applied.

Referring to FIG. 1, the encoder 100 may include a video split unit 110, a subtractor 115, a transform unit 120, a quantization unit 130, a dequantization unit 140, an inverse transform unit 150, a filtering unit 160, a decoded picture buffer (DPB) 170, a prediction unit 180 and an entropy encoding unit 190. Furthermore, the prediction unit 180 may include an inter-prediction unit 181 and an intra-prediction unit 182.

The video split unit 110 splits an input video signal (or picture or frame), input to the encoder 100, into one or more processing units.

The subtractor 115 generates a residual signal (or residual block) by subtracting a prediction signal (or prediction block), output by the prediction unit 180 (i.e., by the inter-prediction unit 181 or the intra-prediction unit 182), from the input video signal. The generated residual signal (or residual block) is transmitted to the transform unit 120.

The transform unit 120 generates transform coefficients by applying a transform scheme (e.g., discrete cosine transform (DCT), discrete sine transform (DST), graph-based transform (GBT) or Karhunen-Loeve transform (KLT)) to the residual signal (or residual block). In this case, the transform unit 120 may generate transform coefficients by performing transform using a prediction mode applied to the residual block and a transform scheme determined based on the size of the residual block.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal outputted by the quantization unit 130 may be used to generate a prediction signal. For example, a residual signal may be reconstructed by applying dequatization and inverse transformation to the quantized signal through the dequantization unit 140 and the inverse transform unit 150. A reconstructed signal may be generated by adding the reconstructed residual signal to the prediction signal output by the inter-prediction unit 181 or the intra-prediction unit 182.

Meanwhile, during such a compression process, neighbor blocks are quantized by different quantization parameters. Accordingly, an artifact in which a block boundary is shown may occur. Such a phenomenon is referred to a blocking artifact, which is one of important factors for evaluating image quality. In order to decrease such an artifact, a filtering process may be performed. Through such a filtering process, the blocking artifact is removed and the error of a current picture is decreased at the same time, thereby improving image quality.

The filtering unit 160 applies filtering to the reconstructed signal, and outputs it through a playback device or transmits it to the decoded picture buffer 170. The filtered signal transmitted to the decoded picture buffer 170 may be used as a reference picture in the inter-prediction unit 181. As described above, an encoding rate as well as image quality can be improved using the filtered picture as a reference picture in an inter-picture prediction mode.

The decoded picture buffer 170 may store the filtered picture in order to use it as a reference picture in the inter-prediction unit 181.

The inter-prediction unit 181 performs temporal prediction and/or spatial prediction with reference to the reconstructed picture in order to remove temporal redundancy and/or spatial redundancy.

In particular, the inter-prediction unit 181 according to the present invention may derive a motion parameter by applying a motion vector scale adaptation method. This is described in detail later.

In this case, a blocking artifact or ringing artifact may occur because a reference picture used to perform prediction is a transformed signal that experiences quantization or dequantization in a block unit when it is encoded/decoded previously.

Accordingly, in order to solve performance degradation attributable to the discontinuity of such a signal or quantization, signals between pixels may be interpolated in a sub-pixel unit by applying a low pass filter to the inter-prediction unit 181. In this case, the sub-pixel means a virtual pixel generated by applying an interpolation filter, and an integer pixel means an actual pixel that is present in a reconstructed picture. A linear interpolation, a bi-linear interpolation, a wiener filter, and the like may be applied as an interpolation method.

The interpolation filter may be applied to the reconstructed picture, and may improve the accuracy of prediction. For example, the inter-prediction unit 181 may perform prediction by generating an interpolation pixel by applying the interpolation filter to the integer pixel and by using the interpolated block including interpolated pixels as a prediction block.

The intra-prediction unit 182 predicts a current block with reference to samples neighboring the block that is now to be encoded. The intra-prediction unit 182 may perform the following procedure in order to perform intra-prediction. First, the intra-prediction unit 182 may prepare a reference sample necessary to generate a prediction signal. Furthermore, the intra-prediction unit 182 may generate a prediction signal using the prepared reference sample. Next, the intra-prediction unit 182 may encode a prediction mode. In this case, the reference sample may be prepared through reference sample padding and/or reference sample filtering. A quantization error may be present because the reference sample experiences the prediction and the reconstruction process. Accordingly, in order to reduce such an error, a reference sample filtering process may be performed on each prediction mode used for the intra-prediction.

The prediction signal (or prediction block) generated through the inter-prediction unit 181 or the intra-prediction unit 182 may be used to generate a reconstructed signal (or reconstructed block) or may be used to generate a residual signal (or residual block).

FIG. 2 illustrates a schematic block diagram of a decoder in which decoding of a still image or video signal is performed, as an embodiment to which the present invention is applied.

Referring to FIG. 2, the decoder 200 may include an entropy decoding unit 210, a dequantization unit 220, an inverse transform unit 230, an adder 235, a filtering unit 240, a decoded picture buffer (DPB) 250 and a prediction unit 260. Furthermore, the prediction unit 260 may include an inter-prediction unit 261 and an intra-prediction unit 262.

Furthermore, a reconstructed video signal output through the decoder 200 may be played back through a playback device.

The decoder 200 receives a signal (i.e., bit stream) output by the encoder 100 shown in FIG. 1. The entropy decoding unit 210 performs an entropy decoding operation on the received signal.

The dequantization unit 220 obtains transform coefficients from the entropy-decoded signal using quantization step size information.

The inverse transform unit 230 obtains a residual signal (or residual block) by inverse transforming the transform coefficients by applying an inverse transform scheme.

The adder 235 adds the obtained residual signal (or residual block) to the prediction signal (or prediction block) output by the prediction unit 260 (i.e., the inter-prediction unit 261 or the intra-prediction unit 262), thereby generating a reconstructed signal (or reconstructed block).

The filtering unit 240 applies filtering to the reconstructed signal (or reconstructed block) and outputs the filtered signal to a playback device or transmits the filtered signal to the decoded picture buffer 250. The filtered signal transmitted to the decoded picture buffer 250 may be used as a reference picture in the inter-prediction unit 261.

In this specification, the embodiments described in the filtering unit 160, inter-prediction unit 181 and intra-prediction unit 182 of the encoder 100 may be identically applied to the filtering unit 240, inter-prediction unit 261 and intra-prediction unit 262 of the decoder, respectively.

In particular, the inter-prediction unit 261 according to the present invention may derive a motion parameter by applying a motion vector scale adaptation method. This is described in detail later.

Processing Unit Split Structure

In general, a block-based image compression method is used in the compression technique (e.g., HEVC) of a still image or a video. The block-based image compression method is a method of processing an image by splitting it into specific block units, and may decrease memory use and a computational load.

FIG. 3 is a diagram for describing a split structure of a coding unit which may be applied to the present invention.

An encoder splits a single image (or picture) into coding tree units (CTUs) of a quadrangle form, and sequentially encodes the CTUs one by one according to raster scan order.

In HEVC, a size of CTU may be determined as one of 64×64, 32×32, and 16×16. The encoder may select and use the size of a CTU based on resolution of an input video signal or the characteristics of input video signal. The CTU includes a coding tree block (CTB) for a luma component and the CTB for two chroma components that correspond to it.

One CTU may be split in a quad-tree structure. That is, one CTU may be split into four units each having a square form and having a half horizontal size and a half vertical size, thereby being capable of generating coding units (CUs). Such splitting of the quad-tree structure may be recursively performed. That is, the CUs are hierarchically split from one CTU in the quad-tree structure.

A CU means a basic unit for the processing process of an input video signal, for example, coding in which intra/inter prediction is performed. A CU includes a coding block (CB) for a luma component and a CB for two chroma components corresponding to the luma component. In HEVC, a CU size may be determined as one of 64×64, 32×32, 16×16, and 8×8.

Referring to FIG. 3, the root node of a quad-tree is related to a CTU. The quad-tree is split until a leaf node is reached. The leaf node corresponds to a CU.

This is described in more detail. The CTU corresponds to the root node and has the smallest depth (i.e., depth=0) value. A CTU may not be split depending on the characteristics of an input video signal. In this case, the CTU corresponds to a CU.

A CTU may be split in a quad-tree form. As a result, lower nodes, that is, a depth 1 (depth=1), are generated. Furthermore, a node (i.e., leaf node) that belongs to the lower nodes having the depth of 1 and that is no longer split corresponds to a CU. For example, in FIG. 3(b), a CU(a), a CU(b) and a CU(j) corresponding to nodes a, b and j have been once split from the CTU, and have a depth of 1.

At least one of the nodes having the depth of 1 may be split in a quad-tree form. As a result, lower nodes having a depth 1 (i.e., depth=2) are generated. Furthermore, a node (i.e., leaf node) that belongs to the lower nodes having the depth of 2 and that is no longer split corresponds to a CU. For example, in FIG. 3(b), a CU(c), a CU(h) and a CU(i) corresponding to nodes c, h and i have been twice split from the CTU, and have a depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a CU(d), a CU(e), a CU(f) and a CU(g) corresponding to nodes d, e, f and g have been three times split from the CTU, and have a depth of 3.

In the encoder, a maximum size or minimum size of a CU may be determined based on the characteristics of a video image (e.g., resolution) or by considering the encoding rate. Furthermore, information about the maximum or minimum size or information capable of deriving the information may be included in a bit stream. A CU having a maximum size is referred to as the largest coding unit (LCU), and a CU having a minimum size is referred to as the smallest coding unit (SCU).

In addition, a CU having a tree structure may be hierarchically split with predetermined maximum depth information (or maximum level information). Furthermore, each split CU may have depth information. Since the depth information represents a split count and/or degree of a CU, it may include information about the size of a CU.

Since the LCU is split in a Quad-tree shape, the size of SCU may be obtained by using a size of LCU and the maximum depth information. Or, inversely, the size of LCU may be obtained by using a size of SCU and the maximum depth information of the tree.

For a single CU, the information (e.g., a split CU flag (split_cu_flag)) that represents whether the corresponding CU is split may be forwarded to the decoder. This split information is included in all CUs except the SCU. For example, when the value of the flag that represents whether to split is '1', the corresponding CU is further split into four CUs, and when the value of the flag that represents whether to split is '0', the corresponding CU is not split any more, and the processing process for the corresponding CU may be performed.

As described above, a CU is a basic unit of the coding in which the intra-prediction or the inter-prediction is performed. The HEVC splits the CU in a prediction unit (PU) for coding an input video signal more effectively.

A PU is a basic unit for generating a prediction block, and even in a single CU, the prediction block may be generated in different way by a unit of PU. However, the intra-prediction and the inter-prediction are not used together for the PUs that belong to a single CU, and the PUs that belong to a single CU are coded by the same prediction method (i.e., the intra-prediction or the inter-prediction).

A PU is not split in the Quad-tree structure, but is split once in a single CU in a predetermined shape. This will be described by reference to the drawing below.

FIG. 4 is a diagram for describing a prediction unit that may be applied to the present invention.

A PU is differently split depending on whether the intra-prediction mode is used or the inter-prediction mode is used as the coding mode of the CU to which the PU belongs.

FIG. 4(a) illustrates a PU if the intra-prediction mode is used, and FIG. 4(b) illustrates a PU if the inter-prediction mode is used.

Referring to FIG. 4(a), assuming that the size of a single CU is 2N×2N (N=4, 8, 16 and 32), the single CU may be split into two types (i.e., 2N×2N or N×N).

In this case, if a single CU is split into the PU of 2N×2N shape, it means that only one PU is present in a single CU.

Meanwhile, if a single CU is split into the PU of N×N shape, a single CU is split into four PUs, and different prediction blocks are generated for each PU unit. However, such PU splitting may be performed only if the size of CB for the luma component of CU is the minimum size (i.e., the case that a CU is an SCU).

Referring to FIG. 4(b), assuming that the size of a single CU is 2N×2N (N=4, 8, 16 and 32), a single CU may be split into eight PU types (i.e., 2N×2N, N×N, 2N×N, N×2N, nL×2N, nR×2N, 2N×nU and 2N×nD)

As in the intra-prediction, the PU split of N×N shape may be performed only if the size of CB for the luma component of CU is the minimum size (i.e., the case that a CU is an SCU).

The inter-prediction supports the PU split in the shape of 2N×N that is split in a horizontal direction and in the shape of N×2N that is split in a vertical direction.

In addition, the inter-prediction supports the PU split in the shape of nL×2N, nR×2N, 2N×nU and 2N×nD, which is an asymmetric motion split (AMP). In this case, 'n' means ¼ value of 2N. However, the AMP may not be used if the CU to which the PU is belonged is the CU of minimum size.

In order to encode the input video signal in a single CTU efficiently, the optimal split structure of the coding unit (CU), the prediction unit (PU) and the transform unit (TU) may be determined based on a minimum rate-distortion value through the processing process as follows. For example, as for the optimal CU split process in a 64×64 CTU, the rate-distortion cost may be calculated through the split process from a CU of 64×64 size to a CU of 8×8 size. The detailed process is as follows.

1) The optimal split structure of a PU and TU that generates the minimum rate distortion value is determined by performing inter/intra-prediction, transformation/quantization, dequantization/inverse transformation and entropy encoding on the CU of 64×64 size.

2) The optimal split structure of a PU and TU is determined to split the 64×64 CU into four CUs of 32×32 size and to generate the minimum rate distortion value for each 32×32 CU.

3) The optimal split structure of a PU and TU is determined to further split the 32×32 CU into four CUs of 16×16 size and to generate the minimum rate distortion value for each 16×16 CU.

4) The optimal split structure of a PU and TU is determined to further split the 16×16 CU into four CUs of 8×8 size and to generate the minimum rate distortion value for each 8×8 CU.

5) The optimal split structure of a CU in the 16×16 block is determined by comparing the rate-distortion value of the 16×16 CU obtained in the process 3) with the addition of the rate-distortion value of the four 8×8 CUs obtained in the process 4). This process is also performed for remaining three 16×16 CUs in the same manner.

6) The optimal split structure of CU in the 32×32 block is determined by comparing the rate-distortion value of the 32×32 CU obtained in the process 2) with the addition of the rate-distortion value of the four 16×16 CUs that is obtained in the process 5). This process is also performed for remaining three 32×32 CUs in the same manner.

7) Finally, the optimal split structure of CU in the 64×64 block is determined by comparing the rate-distortion value of the 64×64 CU obtained in the process 1) with the addition of the rate-distortion value of the four 32×32 CUs obtained in the process 6).

In the intra-prediction mode, a prediction mode is selected as a PU unit, and prediction and reconstruction are performed on the selected prediction mode in an actual TU unit.

A TU means a basic unit in which actual prediction and reconstruction are performed. A TU includes a transform block (TB) for a luma component and a TB for two chroma components corresponding to the luma component.

In the example of FIG. 3, as in an example in which one CTU is split in the quad-tree structure to generate a CU, a TU is hierarchically split from one CU to be coded in the quad-tree structure.

TUs split from a CU may be split into smaller and lower TUs because a TU is split in the quad-tree structure. In HEVC, the size of a TU may be determined to be as one of 32×32, 16×16, 8×8 and 4×4.

Referring back to FIG. 3, the root node of a quad-tree is assumed to be related to a CU. The quad-tree is split until a leaf node is reached, and the leaf node corresponds to a TU.

This is described in more detail. A CU corresponds to a root node and has the smallest depth (i.e., depth=0) value. A CU may not be split depending on the characteristics of an input image. In this case, the CU corresponds to a TU.

A CU may be split in a quad-tree form. As a result, lower nodes having a depth 1 (depth=1) are generated. Furthermore, a node (i.e., leaf node) that belongs to the lower nodes having the depth of 1 and that is no longer split corresponds to a TU. For example, in FIG. 3(b), a TU(a), a TU(b) and a TU(j) corresponding to the nodes a, b and j are once split from a CU and have a depth of 1.

At least one of the nodes having the depth of 1 may be split in a quad-tree form again. As a result, lower nodes having a depth 2 (i.e., depth=2) are generated. Furthermore, a node (i.e., leaf node) that belongs to the lower nodes having the depth of 2 and that is no longer split corresponds to a TU. For example, in FIG. 3(b), a TU(c), a TU(h) and a TU(i) corresponding to the node c, h and I have been split twice from the CU and have the depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a TU(d), a TU(e), a TU(f) and a TU(g) corresponding to the nodes d, e, f and g have been three times split from the CU and have the depth of 3.

A TU having a tree structure may be hierarchically split with predetermined maximum depth information (or maximum level information). Furthermore, each spit TU may have depth information. The depth information may include information about the size of the TU because it indicates the split number and/or degree of the TU.

Information (e.g., a split TU flag "split_transform_flag") indicating whether a corresponding TU has been split with respect to one TU may be transferred to the decoder. The split information is included in all of TUs other than a TU of a minimum size. For example, if the value of the flag indicating whether a TU has been split is "1", the corresponding TU is split into four TUs. If the value of the flag indicating whether a TU has been split is "0", the corresponding TU is no longer split.

Prediction

In order to reconstruct a current processing unit on which decoding is performed, the decoded part of a current picture or other pictures including the current processing unit may be used.

A picture (slice) using only a current picture for reconstruction, that is, on which only intra-prediction is performed, may be called an intra-picture or I picture (slice), a picture (slice) using a maximum of one motion vector and reference index in order to predict each unit may be called a predictive picture or P picture (slice), and a picture (slice) using a maximum of two motion vector and reference indices may be called a bi-predictive picture or B a picture (slice).

Intra-prediction means a prediction method of deriving a current processing block from the data element (e.g., a sample value) of the same decoded picture (or slice). That is, intra-prediction means a method of predicting the pixel value of a current processing block with reference to reconstructed regions within a current picture.

Hereinafter, inter-prediction is described in more detail.

Inter-Prediction (or Inter-Frame Prediction)

Inter-prediction means a prediction method of deriving a current processing block based on the data element (e.g., sample value or motion vector) of a picture other than a current picture. That is, inter-prediction means a method of predicting the pixel value of a current processing block with reference to reconstructed regions within another reconstructed picture other than a current picture.

Inter-prediction (or inter-picture prediction) is a technology for removing redundancy present between pictures and is chiefly performed through motion estimation and motion compensation.

FIG. 5 is an embodiment to which the present invention may be applied and is a diagram illustrating the direction of inter-prediction.

Referring to FIG. 5, inter-prediction may be divided into uni-direction prediction in which only one past picture or future picture is used as a reference picture on a time axis with respect to a single block and bi-directional prediction in which both the past and future pictures are referred at the same time.

Furthermore, the uni-direction prediction may be divided into forward direction prediction in which a single reference picture temporally displayed (or output) prior to a current picture is used and backward direction prediction in which a single reference picture temporally displayed (or output) after a current picture is used.

In the inter-prediction process (i.e., uni-direction or bi-directional prediction), a motion parameter (or information) used to specify which reference region (or reference block) is used in predicting a current block includes an inter-prediction mode (in this case, the inter-prediction mode may indicate a reference direction (i.e., uni-direction or bidirectional) and a reference list (i.e., L0, L1 or bidirectional)), a reference index (or reference picture index or reference list index), and motion vector information. The motion vector information may include a motion vector, motion vector prediction (MVP) or a motion vector difference (MVD). The motion vector difference means a difference between a motion vector and a motion vector predictor.

In the uni-direction prediction, a motion parameter for one-side direction is used. That is, one motion parameter may be necessary to specify a reference region (or reference block).

In the bi-directional prediction, a motion parameter for both directions is used. In the bi-directional prediction method, a maximum of two reference regions may be used. The two reference regions may be present in the same reference picture or may be present in different pictures. That is, in the bi-directional prediction method, a maximum of two motion parameters may be used. Two motion vectors may have the same reference picture index or may have different reference picture indices. In this case, the reference pictures may be displayed temporally prior to a current picture or may be displayed (or output) temporally after a current picture.

The encoder performs motion estimation in which a reference region most similar to a current processing block is searched for in reference pictures in an inter-prediction process. Furthermore, the encoder may provide the decoder with a motion parameter for a reference region.

The encoder/decoder may obtain the reference region of a current processing block using a motion parameter. The reference region is present in a reference picture having a reference index. Furthermore, the pixel value or interpolated value of a reference region specified by a motion vector may be used as the predictor of a current processing block. That is, motion compensation in which an image of a current processing block is predicted from a previously decoded picture is performed using motion information.

In order to reduce the transfer rate related to motion vector information, a method of obtaining a motion vector predictor (mvd) using motion information of previously decoded blocks and transmitting only the corresponding difference (mvd) may be used. That is, the decoder calculates the motion vector predictor of a current processing block using motion information of other decoded blocks and obtains a motion vector value for the current processing block using a difference from the encoder. In obtaining the motion vector predictor, the decoder may obtain various motion vector candidate values using motion information of other already decoded blocks, and may obtain one of the various motion vector candidate values as a motion vector predictor.

Reference Picture Set and Reference Picture List

In order to manage multiple reference pictures, a set of previously decoded pictures are stored in the decoded picture buffer (DPB) for the decoding of the remaining pictures.

A reconstructed picture that belongs to reconstructed pictures stored in the DPB and that is used for inter-prediction is called a reference picture. In other words, a reference picture means a picture including a sample that may be used for inter-prediction in the decoding process of a next picture in a decoding sequence.

A reference picture set (RPS) means a set of reference pictures associated with a picture, and includes all of previously associated pictures in the decoding sequence. A reference picture set may be used for the inter-prediction of an associated picture or a picture following a picture in the decoding sequence. That is, reference pictures retained in the decoded picture buffer (DPB) may be called a reference picture set. The encoder may provide the decoder with a sequence parameter set (SPS) (i.e., a syntax structure having a syntax element) or reference picture set information in each slice header.

A reference picture list means a list of reference pictures used for the inter-prediction of a P picture (or slice) or a B picture (or slice). In this case, the reference picture list may be divided into two reference pictures lists, which may be called a reference picture list 0 (or L0) and a reference picture list 1 (or L1). Furthermore, a reference picture belonging to the reference picture list 0 may be called a reference picture 0 (or L0 reference picture), and a reference picture belonging to the reference picture list 1 may be called a reference picture 1 (or L1 reference picture).

In the decoding process of the P picture (or slice), one reference picture list (i.e., the reference picture list 0). In the decoding process of the B picture (or slice), two reference pictures lists (i.e., the reference picture list 0 and the reference picture list 1) may be used. Information for distinguishing between such reference picture lists for each reference picture may be provided to the decoder through reference picture set information. The decoder adds a reference picture to the reference picture list 0 or the reference picture list 1 based on reference picture set information.

In order to identify any one specific reference picture within a reference picture list, a reference picture index (or reference index) is used.

Fractional Sample Interpolation

A sample of a prediction block for an inter-predicted current processing block is obtained from the sample value of a corresponding reference region within a reference picture identified by a reference picture index. In this case, a corresponding reference region within a reference picture indicates the region of a location indicated by the horizontal component and vertical component of a motion vector. Fractional sample interpolation is used to generate a prediction sample for non-integer sample coordinates except a case where a motion vector has an integer value. For example, a motion vector of ¼ scale of the distance between samples may be supported.

In the case of HEVC, fractional sample interpolation of a luma component applies an 8 tab filter in the traverse direction and longitudinal direction. Furthermore, the fractional sample interpolation of a chroma component applies a 4 tab filter in the traverse direction and the longitudinal direction.

FIG. 6 is an embodiment to which the present invention may be applied and illustrates integers for ¼ sample interpolation and a fraction sample locations.

Referring to FIG. 6, a shadow block in which an upper-case letter (A_i,j) is written indicates an integer sample location, and a block not having a shadow in which a lower-case letter (x_i,j) is written indicates a fraction sample location.

A fraction sample is generated by applying an interpolation filter to an integer sample value in the horizontal direction and the vertical direction. For example, in the case of the horizontal direction, the 8 tab filter may be applied to four integer sample values on the left side and four integer sample values on the right side based on a fraction sample to be generated.

Inter-Prediction Mode

In HEVC, in order to reduce the amount of motion information, a merge mode and advanced motion vector prediction (AMVP) may be used.

1) Merge Mode

The merge mode means a method of deriving a motion parameter (or information) from a spatially or temporally neighbor block.

In the merge mode, a set of available candidates includes spatially neighboring candidates, temporal candidates and generated candidates.

FIG. 7 is an embodiment to which the present invention may be applied and illustrates the location of a spatial candidate.

Referring to FIG. 7(a), whether each spatial candidate block is available depending on the sequence of {A1, B1, B0, A0, B2} is determined. In this case, if a candidate block is not encoded in the intra-prediction mode and motion information is present or if a candidate block is located out of a current picture (or slice), the corresponding candidate block cannot be used.

After the validity of a spatial candidate is determined, a spatial merge candidate may be configured by excluding an unnecessary candidate block from the candidate block of a current processing block. For example, if the candidate block of a current prediction block is a first prediction block within the same coding block, candidate blocks having the same motion information other than a corresponding candidate block may be excluded.

When the spatial merge candidate configuration is completed, a temporal merge candidate configuration process is performed in order of {T0, T1}.

In a temporal candidate configuration, if the right bottom block T0 of a collocated block of a reference picture is available, the corresponding block is configured as a temporal merge candidate. The collocated block means a block present in a location corresponding to a current processing block in a selected reference picture. In contrast, if not, a block T1 located at the center of the collocated block is configured as a temporal merge candidate.

A maximum number of merge candidates may be specified in a slice header. If the number of merge candidates is greater than the maximum number, a spatial candidate and temporal candidate having a smaller number than the maximum number are maintained. If not, the number of additional merge candidates (i.e., combined bi-predictive merging candidates) is generated by combining candidates added so far until the number of candidates becomes the maximum number.

The encoder configures a merge candidate list using the above method, and signals candidate block information, selected in a merge candidate list by performing motion estimation, to the decoder as a merge index (e.g., merge_idx[x0][y0]'). FIG. 7(b) illustrates a case where a B1 block has been selected from the merge candidate list. In this case, an "index 1 (Index 1)" may be signaled to the decoder as a merge index.

The decoder configures a merge candidate list like the encoder, and derives motion information about a current prediction block from motion information of a candidate block corresponding to a merge index from the encoder in the merge candidate list. Furthermore, the decoder generates a prediction block for a current processing block based on the derived motion information (i.e., motion compensation).

2) Advanced Motion Vector Prediction (AMVP) Mode

The AMVP mode means a method of deriving a motion vector prediction value from a neighbor block. Accordingly, a horizontal and vertical motion vector difference (MVD), a reference index and an inter-prediction mode are signaled to the decoder. Horizontal and vertical motion vector values are calculated using the derived motion vector prediction value and a motion vector difference (MVDP) provided by the encoder.

That is, the encoder configures a motion vector predictor candidate list, and signals a motion reference flag (i.e., candidate block information) (e.g., mvp_IX_flag[x0][y0]'), selected in motion vector predictor candidate list by performing motion estimation, to the decoder. The decoder configures a motion vector predictor candidate list like the encoder, and derives the motion vector predictor of a current processing block using motion information of a candidate block indicated by a motion reference flag received from the encoder in the motion vector predictor candidate list. Furthermore, the decoder obtains a motion vector value for the current processing block using the derived motion vector predictor and a motion vector difference transmitted by the encoder. Furthermore, the decoder generates a prediction block for the current processing block based on the derived motion information (i.e., motion compensation).

In the case of the AMVP mode, two spatial motion candidates of the five available candidates in FIG. 7 are selected. The first spatial motion candidate is selected from a {A0, A1} set located on the left side, and the second spatial motion candidate is selected from a {B0, B1, B2} set located at the top. In this case, if the reference index of a neighbor candidate block is not the same as a current prediction block, a motion vector is scaled.

If the number of candidates selected as a result of search for spatial motion candidates is 2, a candidate configuration is terminated. If the number of selected candidates is less than 2, a temporal motion candidate is added.

FIG. 8 is an embodiment to which the present invention is applied and is a diagram illustrating an inter-prediction method.

Referring to FIG. 8, the decoder (in particular, the inter-prediction unit 261 of the decoder in FIG. 2) decodes a motion parameter for a processing block (e.g., a prediction unit) (S801).

For example, if the merge mode has been applied to the processing block, the decoder may decode a merge index signaled by the encoder. Furthermore, the motion parameter of the current processing block may be derived from the motion parameter of a candidate block indicated by the merge index.

Furthermore, if the AMVP mode has been applied to the processing block, the decoder may decode a horizontal and vertical motion vector difference (MVD), a reference index and an inter-prediction mode signaled by the encoder. Furthermore, the decoder may derive a motion vector predictor from the motion parameter of a candidate block indicated by a motion reference flag, and may derive the motion vector value of a current processing block using the motion vector predictor and the received motion vector difference.

The decoder performs motion compensation on a prediction unit using the decoded motion parameter (or information) (S802).

That is, the encoder/decoder perform motion compensation in which an image of a current unit is predicted from a previously decoded picture using the decoded motion parameter.

FIG. 9 is an embodiment to which the present invention may be applied and is a diagram illustrating a motion compensation process.

FIG. 9 illustrates a case where a motion parameter for a current block to be encoded in a current picture is uni-direction prediction, a second picture within LIST0, LIST0, and a motion vector (−a, b).

In this case, as in FIG. 9, the current block is predicted using the values (i.e., the sample values of a reference block) of a location (−a, b) spaced apart from the current block in the second picture of LIST0.

In the case of bi-directional prediction, another reference list (e.g., LIST1), a reference index and a motion vector difference are transmitted. The decoder derives two reference blocks and predicts a current block value based on the two reference blocks.

Motion Information Scale Change Method

The motion vector of the existing inter-prediction (i.e., inter-prediction) includes information having a scale of ¼-pel. The value of a motion vector may be different depending on each processing block. If the value of a motion vector increases, the amount of information to be transmitted from the encoder to the decoder is also increased.

The present invention proposes a method of adaptively changing the unit/scale of information that belongs to additional information indicative of an inter-predicted block and that is related to a motion vector in order to improve performance of inter-prediction. Furthermore, there is proposed a method of signaling a change of the scale from the encoder to the decoder.

For example, in the present invention, the scale of a motion vector may be used as a ¼ pixel (¼-pel) or an integer pixel (int-pel) scale depending on circumstances. Accordingly, an absolute value can be reduced by transmitting information related to a motion vector in an integer pixel unit without departing from the range that does not greatly deteriorates the accuracy of an inter-predicted block. As a result, the amount of transmitted additional information signaled to the decoder is reduced.

Embodiment 1

FIG. 10 illustrates a method of performing inter-prediction by applying motion vector scale adaptation according to an embodiment of the present invention.

Referring to FIG. 10, whether MV scale adaptation is applied or not may be determined in a picture, slice or processing block unit. In this case, the decoder may determine whether to apply MV scale adaptation based on a rule predetermined with the encoder. Alternatively, whether to apply MV scale adaptation may be indicated by a flag signaled by the encoder. FIG. 10 illustrates a case where whether to apply MV scale adaptation is indicated by a flag.

If the flag is off (i.e., a flag value is 0) (i.e., if generalized motion estimation (ME) is applied) (1001), as in the existing method (e.g., HEVC method), a motion vector (MV), a motion vector predictor (MVP), and a motion vector difference (MVd) may be used. In this case, all of the MV, MVP, and the MVd may have a value of a ¼-pel scale.

If the flag is on (i.e., a flag value is 1) (i.e., if MV scale adaptation is applied) (1002), a round function may be applied to the MV and MVP in order to make the MVd a value of an int-pel scale. If the round function is applied to the MV and MVP, the MV and MVP of a ¼-pel scale, each one having a value of an int-pel scale, may be obtained.

Likewise, the MVd is a difference obtained by subtracting the MVP from the MV, and thus an MVd of a ¼-pel scale having a value of an int-pel scale can be obtained.

That is, a value obtained from a difference obtained by the MVP from the MV may always have a value of an int-pel scale. In this case, the MVd is expressed as a ¼-pel scale, and thus the MVd may always be indicated as a multiple of 4.

Furthermore, the encoder may transfer the scaled MVd (i.e., MVd/4) to the decoder (1003). That is, the encoder may convert the MVd into an int-pel scale (i.e., MVd/4) and transmit it to the decoder. As described above, if the MVd/4 is transmitted, the amount of information used to transmit the MVd can be reduced.

FIG. 11 illustrates a method of performing inter-prediction using motion vector scale adaptation according to an embodiment of the present invention.

As described above, the decoder may determine whether to apply MV scale adaptation according to a rule predetermined with the encoder or in response to a flag signaled by the encoder. In this case, FIG. 11 illustrates a case where the flag is transmitted by the encoder.

Referring to FIG. 11, the decoder parses a flag transmitted by the encoder (S1101).

The decoder derives an MVP (S1102). In this case, the decoder may obtain the MVP using motion information of previously decoded blocks as described above.

If, as a result of the parsing of the flag at S1101, the flag is on, the decoder determines that a received MVd is an int-pel scale (i.e., scaled MVd) and performs MV scale adaptation (S1103).

That is, at step S1102, the decoder rounds the derived MVP (round(MVP)). Furthermore, the decoder multiplies the scaled MVd received from the encoder by 4. That is, the decoder converts the received scaled MVd in a ¼-pel scale. Furthermore, the decoder obtains an MV by adding the rounded MVP and the MVd. In this case, a value obtained by multiplying the scaled MVd received from the encoder by 4 is [round(MV)−round(MVP)]. If the value is added to a round(MVP), an MV (i.e., round(MV)) of a ¼-pel scale having a value of an int-pel scale is derived.

Meanwhile, if, as a result of the parsing of the flag at step S1101, the flag is off, the decoder determines that the received MVd is a ¼-pel scale (i.e., an MVd on which motion vector scale adaptation has not been applied), and performs a generalized MV generation procedure like the existing method (e.g., HEVC method) (S1104).

That is, the decoder derives an MV by adding the MVP derived at step S1102 and the MVd received from the encoder. In this case, the MV may have a value of a ¼-pel scale.

As described above, if MV scale adaptation is applied, distortion may increase because an error is generated in an MV, but bits for signaling an MVd can be reduced. Accordingly, MV scale adaptation may be applied to a case where a gain is obtained from a rate-distortion cost (RD cost).

Embodiment 2

In the method proposed in Embodiment 1, a value obtained from a corresponding difference by applying a round function to an MV and an MVP may always have a value of an int-pel scale. Accordingly, if the value is expressed in a ¼-pel scale, it is always expressed in a multiple of 4. Accordingly, the amount of additional information is reduced by transmitting the value to the decoder in an MVd/4 form.

However, in general, the round function has an error. For example, if a round is used as the round function, the round function has an error of a maximum of ½. For example, in the case of the method proposed in Embodiment 1, an MVd is calculated as the results of operation obtained by two round functions, and thus a maximum error is doubled (½ for each function) and thus each round function has an error of one int-pel. Accordingly in the method proposed in Embodiment 2 according to the present invention, an error can reduced, and an MVd can also be scaled down when MV scale adaptation is applied.

FIG. 12 illustrates a method of performing inter-prediction using motion vector scale adaptation according to an embodiment of the present invention.

As described above, the decoder may determine whether to apply MV scale adaptation according to a rule predetermined with the encoder or in response to a flag signaled by the encoder. In this case, FIG. 12 illustrates a case where a flag is transmitted by the encoder.

If the flag is off (i.e., a flag value is 0) (i.e., if a generalized motion estimation (ME) is applied) (1201), a motion vector (MV), a motion vector predictor (MVP), and a motion vector difference (MVd) may be used like the existing method (e.g., HEVC method). That is, all of the MV, MVP, and MVd may have a value of a ¼-pel scale.

If the flag is on (i.e., a flag value is 1) (i.e., if MV scale adaptation is applied) (1202), unlike in Embodiment 1, the round function is not directly applied to an MV and an MVP. Accordingly, as in the generalized ME, an MVd is obtained from a difference between an MV and an MVP.

In this case, in accordance with the method proposed in Embodiment 2, the round function may be applied to the MVd obtained from the difference between the MV and the MVP. As a result, an MVd of a ¼-pel scale having a value of an int-pel scale may be obtained. As described above, the MVd is expressed in a ¼-pel scale, and the MVd may always be indicated as a multiple of 4.

Accordingly, as a result, the encoder may transfer a scaled MVd (i.e., MVd/4) to the decoder (1203). That is, the encoder may convert the MVd in an int-pel scale (i.e., MVd/4) and transfer it to the decoder. As described above, if the MVd/4 is transmitted, the amount of information used to transmit the MVd can be reduced.

However, in this case, the encoder uses a value obtained by adding the MVP and the round(MV-MVP) as an actual MV in order to use the same MV as that of the decoder. This is described in more detail later.

In this case, unlike in the method proposed in Embodiment 1, the round function is applied to only one the final MVd. Accordingly, a maximum error becomes ½ and thus can be reduced to half the method proposed in Embodiment 1.

FIG. 13 illustrates a method of performing inter-prediction using motion vector scale adaptation according to an embodiment of the present invention.

As described above, the decoder may determine whether to apply MV scale adaptation according to a rule predetermined with the encoder or in response to a flag signaled by the encoder. However, FIG. 13 illustrates a case where the flag is transmitted by the encoder.

Referring to FIG. 13, the decoder parses a flag transmitted by the encoder (S1301).

The decoder derives an MVP (S1302). In this case, as described above, the decoder may obtain the MVP using motion information of previously decoded blocks.

If, as a result of the parsing of the flag at S1301, the flag is on, the decoder determines that a received MVd is an int-pel scale (i.e., scaled MVd) and performs MV scale adaptation (S1303).

That is, the decoder multiples a scaled MVd received from the encoder by 4. That is, the decoder converts the received scaled MVd in a ¼-pel scale. Furthermore, the decoder obtains an MV by adding the MVP received at step S1302 and the MVd. In this case, a value obtained by multiplying the scaled MVd received from the encoder by 4 is [round(MV-MVP)]. If the value is added to the MVP, an MV (i.e., round(MV-MVP)+MVP) of a ¼-pel scale is derived.

Meanwhile, if, as a result of the parsing of the flag at step S1301, the flag is off, the decoder determines that the received MVd is a ¼-pel scale (i.e., an MVd to which motion vector scale adaptation has not been applied), and performs a generalized MV generation procedure as in the existing method (e.g., HEVC method) (S1304).

That is, the MV is derived by adding the MVP derived at step S1302 and the MVd received from the encoder. In this case, the MV may have a value of a ¼-pel scale.

Meanwhile, in Embodiments 1 and 2, the round function has been assumed and described, for convenience of description, but the present invention is not limited thereto. That is, ceiling operation or floor operation may be used instead of the round operation. Alternatively, the aforementioned operations (i.e., round, ceiling and floor operations) may be selectively combined and used.

Furthermore, if the MVd obtained through MV scale adaptation used in Embodiment 1 and 2 is 0, MV scale adaptation may not be applied. In this case, conventional motion information may be used without any changed. The reason for this is that if an MVd of 0 is obtained, an information amount reduction effect in transmitting a down-scaled MVd cannot be obtained.

Accordingly, in order to check whether an MVd obtained through MV scale adaptation is 0, the decoder may perform flag parsing for MV scale adaptation after motion information, in particular, after MVd parsing is ended.

Furthermore, the methods proposed in Embodiment 1 and 2 are for increasing coding efficiency through a reduction of the amount of information of an MVd, and may not be applied to a case where motion information is derived as in the merge mode.

Hereinafter, the present invention proposes a method of additionally signaling a motion vector difference (MVD). In this case, an MVD value (in particular, an MVD absolute value—2) may correspond to the aforementioned scaled MVD and an MVD generated by the existing method.

TABLE 1

|  | Descriptor |
|---|---|
| mvd_coding( x0, y0, refList ) { |  |
|   abs_mvd_greater0_flag[ 0 ] | ae(v) |
|   abs_mvd_greater0_flag[ 1 ] | ae(v) |
|   if( abs_mvd_greater0_flag[ 0 ] ) |  |
|     abs_mvd_greater1_flag[ 0 ] | ae(v) |
|   if( abs_mvd_greater0_flag[ 1 ] ) |  |
|     abs_mvd_greater1_flag[ 1 ] | ae(v) |
|   if( abs_mvd_greater0_flag[ 0 ] ) { |  |
|     if( abs_mvd_greater1_flag[ 0 ] ) |  |
|       abs_mvd_minus2[ 0 ] | ae(v) |
|     mvd_sign_flag[ 0 ] | ae(v) |
|   } |  |
|   if( abs_mvd_greater0_flag[ 1 ] ) { |  |
|     if( abs_mvd_greater1_flag[ 1 ] ) |  |
|       abs_mvd_minus2[ 1 ] | ae(v) |
|     mvd_sign_flag[ 1 ] | ae(v) |
|   } |  |
| } |  |

Referring to Table 1, in the existing inter-prediction (i.e., inter-prediction), a motion vector difference is signaled using four abs_mvd_greater0_flag, abs_mvd_greater1_flag, abs_mvd_minus2, and mvd_sign_flag syntax (or semantic).

The meaning of each syntax (or semantic) is listed in Table 2.

Table 2 illustrates syntaxes (or semantics) related to a motion vector difference (MVD).

TABLE 2

| Syntax | Meaning |
|---|---|
| abs_mvd_greater0_flag | Indicate whether absolute value of MVd is greater than 0 |
| abs_mvd_greater1_flag | Indicate whether absolute value of MVd is greater than 1 |
| abs_mvd_minus2 | Absolute value of MVd − 2 |
| mvd_sign_flag | Sign of MVd |

Referring to Table 1 and Table 2, with respect to an MVD having the smallest value, encoding is possible using the least information through a flag. With respect to an MVD having a great value, an absolute value and a symbol are encoded.

Hereinafter, the present invention proposes a method of grouping an absolute value (abs_mvd_minus2) of an MVD into a specific interval without encoding/decoding the absolute value, indicating that the absolute indicates which value in the interval with respect to a scaled-down MVD value, and encoding/decoding the absolute value. Accordingly, the amount of information used to encode/decode an MVD, and thus the amount of additional information is reduced.

Hereinafter, in the description of the present invention, the "absolute value of an MVD" (i.e., a value of abs_mvd_minus2) is indicated as "MVD-2", for convenience of description.

Embodiment 3

FIG. 14 illustrates a method of encoding/decoding a motion vector difference according to an embodiment of the present invention.

FIG. 14 illustrates a case where MVD-2 values are grouped every two values.

Referring to FIG. 14, the encoder may encode an MVD having a value of 0, 1 using the same method as the existing method.

Furthermore, the encoder may group the remaining values of MVD-2 every two values for each interval, may make the start values 0, 2, 4, 6, 8, . . . of the respective intervals smaller numbers 0, 1, 2, 3, 4, . . . by scaling down each of the start values to ½ (i.e., by dividing the start value by 2), and may perform encoding. Furthermore, an additional flag may be used so that any one of two values belonging to each interval can be selected. That is, an MVD-2 value may be transferred to the decoder as information (e.g., an additional flag) for indicating the start value of a interval to which MVD-2 scaled down to ½ belongs and the location of an MVD-2 value within the corresponding interval.

Accordingly, in accordance with the present embodiment, an additional flag is used to transmit an MVD-2 value. However, the use of the additional flag is offset through the gain of bits obtained by scaling down the start value of a interval to which a corresponding MVD belongs to ½. Accordingly, MVD-2 can be binary-encoded using smaller bits than bits used for the transmission of the existing MVD-2.

The decoder may decode an MVD having a value of 0, 1 from a bit string received from the encoder using the same method as the existing method. Furthermore, the decoder may decode the start value of a interval to which MVD-2 scaled down to ½ and information (e.g., a flag) for indicating the location of the MVD-2 value within the corresponding interval from the bit string received from the encoder with respect to the remaining values of MVD-2. Furthermore, the decoder may identify a interval to which MVD-2 belongs by up-scaling the decoded start value twice, and may identify the MVD-2 value based on the information for indicating the location of the decoded MVD-2 value within the corresponding interval.

Embodiment 4

FIG. 15 illustrates a method of encoding a motion vector difference according to an embodiment of the present invention.

FIG. 15 illustrates a case where MVD-2 values are grouped every three values.

Referring to FIG. 15, the encoder may encode an MVD having a value of 0, 1 using the same method as the existing method.

Furthermore, the encoder may group the remaining values of MVD-2 every three values for each interval, may make the start values 0, 3, 6, 9, . . . of the respective intervals, may make the start values 0, 3, 6, 9, . . . smaller numbers 0, 1, 2, 3, . . . by scaling down the start values to ⅓ (i.e., by dividing each start value by 3), and may encode the start values. Furthermore, an additional index may be used so that any one of three values belonging to each interval can be selected. That is, an MVD-2 value may be transferred to the decoder as information (e.g., an additional index) for indicating the start value of a interval to which MVD-2 scaled down to ⅓ belongs and the location of the MVD-2 value within the corresponding interval.

In this case, in order to encode the additional index, truncated unary (TU) code may be used. The TU code is illustrated in Table 3 and Table 4.

TABLE 3

| Entry | TU code |
| --- | --- |
| a | 0 |
| a + 1 | 10 |
| a + 2 | 11 |

TABLE 4

| Entry | TU code |
| --- | --- |
| a | 1 |
| a + 1 | 01 |
| a + 2 | 00 |

Table 3 and Table 4 illustrate TU code whose code size gradually increased from "a" to a+1 and a+2, but the present invention is not limited thereto. The sequence of TU code may be randomly changed. That is, the smallest bit may be assigned to "a+2", and the size of code may increase toward "a+1" and "a." Furthermore, TU code of a form in which the smallest bit is assigned to "a+1" may be used.

In the present embodiment, as in Embodiment 3, the amount of information used to encode an additional index is offset through a gain of bits obtained by scaling down the start value of each interval for MVD-2 to ⅓ and transmitting the value. Accordingly, MVD-2 can be binary-encoded using smaller bits than bits used for the existing MVD-2 transmission.

The decoder may decode an MVD having a value of 0, 1 from a bit string received from the encoder using the same method as the existing method. Furthermore, the decoder may decode the start value of a interval to which MVD-2 down-scaled to ⅓ belongs and information (e.g., an index) for indicating the location of the MVD-2 value within the corresponding interval from the bit string received from the encoder with respect to the remaining values of MVD-2. Furthermore, the decoder may identify the interval to which the MVD-2 belongs by up-scaling the decoded start value three times, and may identify the MVD-2 value based on the information for indicating the location of the decoded MVD-2 value within the corresponding interval.

Embodiment 5

FIG. 16 illustrates a method of encoding a motion vector difference according to an embodiment of the present invention.

FIG. 16 illustrates a case where MVD-2 values are grouped every four values.

Referring to FIG. 16, the encoder may encode an MVD having a value of 0, 1 using the same method as the existing method.

Furthermore, the encoder may group the remaining values of MVD-2 every four values for each interval, may make the start values 0, 4, 8, . . . of each interval smaller numbers 0, 1, 2, . . . by scaling down the start values to ¼ (i.e., by dividing each start value by 4), and may encode the start values. Furthermore, an additional index may be used so that any one of four values belonging to each interval may be selected. That is, the MVD-2 value may be transferred to the decoder as the start value of a interval to which the MVD-2 scaled down to ¼ belongs and information (e.g., an additional index) for indicating the location of the MVD-2 value within the corresponding interval.

In this case, in order to encode the additional index, fixed 2-bit code may be used or binary encoding of a different form, such as TU code or Golomb code, may be used.

The decoder may decode the MVD having a value of 0, 1 from a bit string received from the encoder using the same method as the existing method. Furthermore, the decoder may decode the start value of a interval to which MVD-2 down-scaled ¼ belongs and information (e.g., an index) for indicating the location of the MVD-2 value within the corresponding interval from the bit string received from the encoder with respect to the remaining values of MVD-2. Furthermore, the decoder may identify the interval to which the MVD-2 belongs by up-scaling the decoded start value four times, and may identify the MVD-2 value based on the information for indicating the location of the decoded MVD-2 value within the corresponding interval.

If the methods proposed in Embodiments 3 to 5 are generalized, they may be generalized using a method of grouping MVD-2 every N values for each interval. In this case, the start value of each interval may be made into a smaller number by scaling down the start value to 1/N and encoded. Additional information (i.e., information for indicating the location of MVD-2 within a corresponding interval, for example, a flag or an index) for selecting one of N values belonging to each interval is required. Furthermore, in order to encode the additional information, a specific binary encoding method may be used.

In this case, the decoder may decode an MVD having a value of 0, 1 from a bit string received from the encoder using the same method as the existing method. Furthermore, the decoder may decode the start value of a interval to which MVD-2 down-scaled to 1/N belongs and information (e.g., an index) for indicating the location of the MVD-2 value within the corresponding interval from the bit string received from the encoder with respect to the remaining values of MVD-2. Furthermore, the decoder may identify the interval to which the MVD-2 belongs by up-scaling the decoded start value N times, and may identify the MVD-2 value based on the information for indicating the location of the decoded MVD-2 value within the corresponding interval.

Meanwhile, in Embodiments 3 to 5, a case where the start value of the interval to which the MVD-2 value belongs has been illustrated, but the present invention is not limited thereto. A specific value (e.g., the last value of each interval) within the interval to which the MVD-2 value belongs may be used.

In this case, the size of N may be previously fixed or may have been previously known to both the encoder and the decoder.

Furthermore, the size of the interval N that groups the values of MVD-2 may be variably determined. In this case, the encoder may signal information about the size of the interval N that groups the value of MVD-2 to the decoder.

For example, the information may be transmitted through a sequence parameter set (SPS), a picture parameter set (PPS), a video parameter set (VPS), a slice header or the like, or may be transmitted in a CTB, CU or PU unit. For example, if information about the size of N is signaled in the SPS, MVD-2 is grouped every N values for each interval in a corresponding sequence and may be binary-encoded/decoded using the methods described in the aforementioned embodiments.

In contrast, for another example, if information about the size of N is signaled in a slice header, the encoder may set an optimal interval of a different value for each slice. In this case, MVD-2 is grouped every N values for each interval depending on the size of N set for each slice and may be binary-encoded/decoded using the methods described in the aforementioned embodiments.

Furthermore, whether or not to use the aforementioned methods described in Embodiments 3 to 5, that is, a method of grouping the values of MVD-2 for each interval and binary-encoding/decoding the start value of a group to which the MVD-2 belongs and information or identifying the MVD-2 value may be signaled to the decoder. For example, the method may be signaled through the SPS, PPS, VPS or slice header or may be signaled in the CTB, CU or PU unit.

For example, whether or not to use the method with respect to the sequence may be signaled in the SPS, and whether or not to use the method in the slice unit of a slice header may be signaled. If the method is determined to be used in the slice unit, a predetermined fixed value may be used with respect to the size of the interval N or the size of the interval N may be additionally signaled and used as described above.

Meanwhile, the existing MVD-2 has been binary-encoded using primary exponential Golomb code. If the size of N is a square number of 2 and an index is binary-encoded as a bit of a fixed size in order to select N, that is, N=2^x is satisfied, the same effect as that that (x+1)-th exponential Golomb code has been used is obtained.

Table 5 illustrates the number of necessary bits if MVD-2 is binary-encoded using primary exponential Golomb code according to the existing method.

TABLE 5

| mvd | abs_mvd_minus2 | EG1_code_bit |
|---|---|---|
| 0 | — | 0 |
| 1 | — | 0 |
| 2 | 0 | 2 |
| 3 | 1 | 2 |
| 4 | 2 | 3 |
| 5 | 3 | 3 |
| 6 | 4 | 3 |
| 7 | 5 | 3 |
| 8 | 6 | 4 |
| 9 | 7 | 4 |
| 10 | 8 | 4 |
| 11 | 9 | 4 |
| 12 | 10 | 4 |
| 13 | 11 | 4 |
| 14 | 12 | 4 |
| 15 | 13 | 4 |
| 16 | 14 | 5 |
| 17 | 15 | 5 |
| 18 | 16 | 5 |
| 19 | 17 | 5 |
| 20 | 18 | 5 |
| 21 | 19 | 5 |
| 22 | 20 | 5 |
| 23 | 21 | 5 |
| 24 | 22 | 5 |
| 25 | 23 | 5 |
| 26 | 24 | 5 |
| 27 | 25 | 5 |
| 28 | 26 | 5 |
| 29 | 27 | 5 |

Referring to Table 5, "abs_mvd_minus2" indicates an MVD-2 value, and an "EG1_code_bit" indicates the number of bits when MVD-2 is converted into primary exponential Golomb code.

Table 6 illustrates the number of bits required when the start value of a interval to which MVD-2 down-scaled to ½ belongs and an index for specifying the MVD-2 within the corresponding interval are encoded according to an embodiment of the present invention.

TABLE 6

| mvd | abs_mvd_minus2 | scale_down_mvd | EG1_code_bit | index_bit | total bit |
|---|---|---|---|---|---|
| 0 | — | — | 0 | 0 | |
| 1 | — | — | 0 | 0 | |
| 2 | 0 | 0 | 2 | 1 | 3 |
| 3 | 1 | 0 | 2 | 1 | 3 |
| 4 | 2 | 1 | 2 | 1 | 3 |
| 5 | 3 | 1 | 2 | 1 | 3 |
| 6 | 4 | 2 | 3 | 1 | 4 |
| 7 | 5 | 2 | 3 | 1 | 4 |
| 8 | 6 | 3 | 3 | 1 | 4 |
| 9 | 7 | 3 | 3 | 1 | 4 |
| 10 | 8 | 4 | 3 | 1 | 4 |
| 11 | 9 | 4 | 3 | 1 | 4 |
| 12 | 10 | 5 | 3 | 1 | 4 |
| 13 | 11 | 5 | 3 | 1 | 4 |
| 14 | 12 | 6 | 4 | 1 | 5 |
| 15 | 13 | 6 | 4 | 1 | 5 |
| 16 | 14 | 7 | 4 | 1 | 5 |
| 17 | 15 | 7 | 4 | 1 | 5 |
| 18 | 16 | 8 | 4 | 1 | 5 |
| 19 | 17 | 8 | 4 | 1 | 5 |
| 20 | 18 | 9 | 4 | 1 | 5 |
| 21 | 19 | 9 | 4 | 1 | 5 |

TABLE 6-continued

| mvd | abs_mvd_minus2 | scale_down_mvd | EG1_code_bit | index_bit | total bit |
|---|---|---|---|---|---|
| 22 | 20 | 10 | 4 | 1 | 5 |
| 23 | 21 | 10 | 4 | 1 | 5 |
| 24 | 22 | 11 | 4 | 1 | 5 |
| 25 | 23 | 11 | 4 | 1 | 5 |
| 26 | 24 | 12 | 4 | 1 | 5 |
| 27 | 25 | 12 | 4 | 1 | 5 |
| 28 | 26 | 13 | 4 | 1 | 5 |
| 29 | 27 | 13 | 4 | 1 | 5 |

Table 7 illustrates the number of bits required when the start value of a interval to which MVD-2 down-scaled to ¼ belongs and an index for specifying the MVD-2 within the corresponding interval are encoded according to an embodiment of the present invention.

TABLE 7

| mvd | abs_mvd_minus2 | scale_down_mvd | EG1_code_bit | index_bit | total bit |
|---|---|---|---|---|---|
| 0 | — | — | 0 | 0 | |
| 1 | — | — | 0 | 0 | |
| 2 | 0 | 0 | 2 | 2 | 4 |
| 3 | 1 | 0 | 2 | 2 | 4 |
| 4 | 2 | 0 | 2 | 2 | 4 |
| 5 | 3 | 0 | 2 | 2 | 4 |
| 6 | 4 | 1 | 2 | 2 | 4 |
| 7 | 5 | 1 | 2 | 2 | 4 |
| 8 | 6 | 1 | 2 | 2 | 4 |
| 9 | 7 | 1 | 2 | 2 | 4 |
| 10 | 8 | 2 | 3 | 2 | 5 |
| 11 | 9 | 2 | 3 | 2 | 5 |
| 12 | 10 | 2 | 3 | 2 | 5 |
| 13 | 11 | 2 | 3 | 2 | 5 |
| 14 | 12 | 3 | 3 | 2 | 5 |
| 15 | 13 | 3 | 3 | 2 | 5 |
| 16 | 14 | 3 | 3 | 2 | 5 |
| 17 | 15 | 3 | 3 | 2 | 5 |
| 18 | 16 | 4 | 3 | 2 | 5 |
| 19 | 17 | 4 | 3 | 2 | 5 |
| 20 | 18 | 4 | 3 | 2 | 5 |
| 21 | 19 | 4 | 3 | 2 | 5 |
| 22 | 20 | 5 | 3 | 2 | 5 |
| 23 | 21 | 5 | 3 | 2 | 5 |
| 24 | 22 | 5 | 3 | 2 | 5 |
| 25 | 23 | 5 | 3 | 2 | 5 |
| 26 | 24 | 6 | 4 | 2 | 6 |
| 27 | 25 | 6 | 4 | 2 | 6 |
| 28 | 26 | 6 | 4 | 2 | 6 |
| 29 | 27 | 6 | 4 | 2 | 6 |

Referring to Tables 6 and 7, "abs_mvd_minus2" indicates an MVD-2 value, and "scale_down_mvd" indicates a value down-scaled from the start value of a interval to which MVD-2 belongs. EG1_code_bit indicates the number of bits when the down-scaled start value of the interval is converted into primary exponential Golomb code as in Table 5. "index_bit" indicates the number of bits necessary to distinguish between elements within each interval grouped every N. "total bit" indicates "EG1_code_bit"+"index_bit."

If the number of bits "EG1_code_bit" in Table 5 is compared with a total bit in Table 6 and Table 7, the same effect as that that (x+1)-th exponential Golomb code has been used is obtained in the case of N=2^x. That is, in the case of Table 6, since N=2, the same effect as that that secondary exponential Golomb code has been used can be obtained. In the case of Table 7, since N=4, the same effect as that that tertiary exponential Golomb code has been used can be obtained.

Accordingly, in the aforementioned methods, the size of N may be limited to only a square number of 2. In this case, assuming that the method proposed in the present invention is adaptively applied for each specific unit, the size of N is not signaled, but the degree of exponential Golomb code for binary-encoding MVD-2 may be signaled. Accordingly, the best binary coding can be performed.

If the method is used, as described in Embodiments 3 to 5, MVD-2 may be binary-encoded/decoded by scaling down the start value and the index of a interval is not additionally encoded/decoded, but the value of MVD-2 itself may be directly binary-encoded/decoded into (x+1)-th exponential Golomb code and used.

FIG. 17 is a diagram illustrating an intra-prediction unit according to an embodiment of the present invention.

In FIG. 17, for convenience of description, the intra-prediction unit 182 (refer to FIG. 1); 262 (refer to FIG. 2) has been illustrated as being a single block, but the intra-prediction unit 182 may be implemented to have a configuration included in the encoder and/or the decoder.

Referring to FIG. 17, the intra-prediction unit 182, 262 implements the functions, processes and/or methods proposed in FIGS. 5 to 16. Specifically, the intra-prediction unit 182, 262 may include an MV scale adaptation application determination unit 1701, a motion parameter decoding unit 1702, and a prediction block generation unit 1703.

The MV scale adaptation application determination unit 1701 determines whether to apply MV scale adaptation to a current block.

In this case, the decoder may determine whether to apply MV scale adaptation according to a rule predetermined with the encoder. Alternatively, whether to apply MV scale adaptation may be indicated by a flag signaled by the encoder.

The motion parameter decoding unit 1702 decodes a motion parameter for a current block. In this case, the motion parameter decoding unit 1702 may decode the motion parameter for the current block using the functions, processes and/or methods proposed in FIGS. 5 to 16.

In this case, if MV scale adaptation is not applied to the current block, the decoder may determine that a not-down-scaled MVD has been signaled.

The decoder may derive an MVP from motion information of a neighbor block as in the existing method, and may decode an MVD signaled by the encoder. Furthermore, the decoder may derive the MV of the current block by adding the MVP and the MVD together. In this case, all of the MV, MVP and MVd may have a value of a 1/n-pel scale (e.g., n=4).

In contrast, if MV scale adaptation is not applied to the current block, the decoder may determine that the down-scaled MVD has been signaled.

Accordingly, the decoder up-scales the down-scaled MVD signaled by the encoder. Furthermore, as in the existing method, the decoder may derive an MVP from motion information of a neighbor block. Furthermore, as in Embodiment 1, the decoder may derive an MV by adding the MVP to which round operation has been applied and the up-scaled MVD together. In this case, an MV (i.e., round (MV)), that is, a 1/n-pel scale (e.g., n=4) having a value of an int-pel scale, may be derived. Alternatively, as in Embodiment 2, an MV may be derived by adding the MVP and the up-scaled MVD together. In this case, the MV may have a value of a 1/n-pel scale (e.g., n=4).

The prediction block generation unit 1703 generates a prediction block for a current block using a decoded motion parameter.

That is, the prediction block generation unit 1703 generates the prediction sample value of the current block from the sample value of a reference region identified by a motion vector within a reference picture.

FIG. 18 is a diagram illustrating an inter-prediction-based image processing method according to an embodiment of the present invention.

Referring to FIG. 18, the decoder determines whether to apply MV scale adaptation to a current block (S1801).

In this case, the decoder may determine whether to apply MV scale adaptation according to a rule predetermined with the encoder. Alternatively, whether to apply MV scale adaptation may be indicated by a flag signaled by the encoder.

The decoder decodes a motion parameter for the current block (S1802).

In this case, if MV scale adaptation has not been applied to the current block at step S1801, the decoder may determine that a not-down-scaled MVD has been signaled.

The decoder may derive an MVP from motion information of neighbor block as in the existing method, and may decode an MVD signaled by the encoder. Furthermore, the decoder may derive the MV of the current block by adding the MVP and the MVD together. In this case, all of the MV, MVP and MVd may have a value of a 1/n-pel scale (e.g., n=4).

In contrast, if MV scale adaptation is not applied to the current block at step S1801, the decoder may determine that a down-scaled MVD has been signaled.

Accordingly, the decoder up-scales the down-scaled MVD signaled by the encoder. Furthermore, the decoder may derive an MVP from motion information of a neighbor block as in the existing method. Furthermore, as in Embodiment 1, the decoder may derive an MV by adding the MVP to which round operation has been applied and the up-scaled MVD together. In this case, an MV (i.e., round(MV)), that is, a 1/n-pel scale (e.g., n=4) having a value of an int-pel scale, may be derived. Alternatively, as in Embodiment 2, an MV may be derived by adding the MVP and the up-scaled MVD together. In this case, the MV may have a value of a 1/n-pel scale (e.g., n=4).

The decoder generates a prediction block for the current block using the decoded motion parameter (S1803).

The decoder performs motion compensation in which an image of a current unit is predicted from a previously decoded picture using the decoded motion parameter. That is, the decoder generates a prediction sample value of the current block from the sample value of a reference region identified by a motion vector within a reference picture.

Meanwhile, the value of the MVD signaled by the encoder or the down-scaled MVD may be encoded/decoded according to the aforementioned methods of Embodiments 3 to 5.

In this case, if the MVD value is 0, 1, it may be decoded using the same method as the existing method.

In contrast, if the MVD has a value of 2 or more, it may be signaled as MVD-2. In this case, the MVD-2 may be signaled as the start value of a interval to which MVD-2 down-scaled to 1/N belongs and information (e.g., an index) for indicating the location of the MVD-2 value within the corresponding interval may be signaled according to the aforementioned methods of Embodiments 3 to 5.

In the aforementioned embodiments, the elements and characteristics of the present invention have been combined in specific forms. Each of the elements or characteristics may be considered to be optional unless otherwise described explicitly. Each of the elements or characteristics may be implemented in a form in which it is not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be configured by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The aforementioned preferred embodiments of the present invention have been disclosed for illustrative purposes, and those skilled in the art may improve, change, substitute, or add various other embodiments without departing from the technological spirit and scope of the present invention disclosed in the attached claims.

The invention claimed is:

1. A method of decoding a video signal, comprising:
   obtaining residual samples of a current block;
   deriving a motion vector predictor (MVP) based on motion information of a neighbor block of the current block;
   obtaining a motion vector difference (MVD) of the current block;
   obtaining a flag related to a resolution of the MVD, a value 0 of the flag specifying that the resolution of the MVD is ¼ pel-scale;
   rounding the MVP based on the flag;
   scaling the MVD based on the flag;
   obtaining a motion vector (MV) of the current block based on the scaled MVD and the rounded MVP;
   generating prediction samples of the current block based on the MV; and
   generating reconstructed samples of the current block based on the prediction samples and the residual samples.

2. The method of claim 1, wherein the MVD is obtained based on a plurality of syntax elements, comprising:
   a first flag including information about whether an absolute value of the MVD is greater than 0;
   a second flag including information about an absolute value of the MVD is greater than 1, the second flag being parsed when the MVD is greater than 0;
   a value obtained by subtracting 2 from an absolute value of the MVD; and
   a third flag including information about a sign of the MVD.

3. The method of claim 2, wherein the second flag and the third flag are parsed when the MVD is greater than 0, and the value is parsed when the second flag is not equal to 0.

4. The method of claim 1, wherein the scaling of the MVD up-scales the MVD.

5. The method of claim 1, wherein the flag is parsed when the obtained MVD is not 0.

6. The method of claim 1, wherein a round function is applied to the MVP and the MVD is multiplied by 4 based on that the flag is equal to a first value.

7. The method of claim 1, wherein the MVD is grouped in units of intervals and binary-encoded.

8. The method of claim 7, wherein the MVD is encoded as a start value of an interval to which the MVD belongs and indication information for indicating the MVD within the interval.

9. The method of claim 8, wherein the start value is down-scaled at a ratio of a size of the interval and transmitted.

10. The method of claim 9, wherein the size of the interval is predetermined or transmitted from an encoder.

11. The method of claim 7, wherein the MVD is grouped in units of intervals and encoded only when the MVD is 2 or more.

12. The method of claim 7 wherein a size of the interval is set to a square number of 2.

13. An apparatus for decoding a video signal, comprising:
    a memory configured to store the video signal; and
    a processor coupled to the memory and configured to:
    obtain residual samples of a current block;
    derive a motion vector predictor (MVP) based on motion information of a neighbor block of the current block;
    obtain a motion vector difference (MVD) of the current block;
    obtain a flag related to a resolution of the MVD, a value 0 of the flag specifying that the resolution of the MVD is ¼ pa-scale;
    round the MVP based on the flag;
    scaling the MVD based on the flag;
    obtain a motion vector (MV) of the current block based on the scaled MVD and the rounded MVP;
    generate prediction samples of the current block based on the MV; and
    generate reconstructed samples of the current block based on the prediction samples and the residual samples.

* * * * *